June 16, 1953 L. B. BUTTERFIELD ET AL 2,641,997

CONTROL CIRCUIT FOR CONTINUOUSLY OPERATING ELECTROPHOTOGRAPHIC PRINTERS

Filed Sept. 21, 1950 10 Sheets-Sheet 1

INVENTORS
Louis B. Butterfield
John H. Sulzer,
BY C. B. Hamilton
ATTORNEY

June 16, 1953 L. B. BUTTERFIELD ET AL 2,641,997

CONTROL CIRCUIT FOR CONTINUOUSLY OPERATING ELECTROPHOTOGRAPHIC PRINTERS

Filed Sept. 21, 1950 10 Sheets-Sheet 2

INVENTORS

Louis B. Butterfield

John H. Sulzer,

BY

C. B. Hamilton.

ATTORNEY

June 16, 1953 L. B. BUTTERFIELD ET AL 2,641,997

CONTROL CIRCUIT FOR CONTINUOUSLY OPERATING ELECTROPHOTOGRAPHIC PRINTERS

Filed Sept. 21, 1950 10 Sheets-Sheet 3

INVENTORS

Louis B. Butterfield

John H. Sulzer,

BY C. B. Hamilton, ATTORNEY

INVENTORS
Louis B. Butterfield
John H. Sulzer,
BY
C. B. Hamilton
ATTORNEY

Inventors
Louis B. Butterfield
John H. Sulzer,
BY C. B. Hamilton ATTORNEY

INVENTORS
Louis B. Butterfield
John K. Sulzer,
BY
C. B. Hamilton.
ATTORNEY

INVENTORS
Louis Butterfield
John H. Sulzer
BY
C. B. Hamilton
ATTORNEY

INVENTORS
Louis B. Butterfield
John H. Sulzer

BY C. B. Hamilton
ATTORNEY

INVENTORS
Louis B. Butterfield
John H. Sulzer,
BY
C. B. Hamilton
ATTORNEY

INVENTORS
Louis B. Butterfield
BY John K. Sulzer

C. B. Hamilton
Attorney

Patented June 16, 1953 2,641,997

UNITED STATES PATENT OFFICE 2,641,997

CONTROL CIRCUIT FOR CONTINUOUSLY OPERATING ELECTROPHOTOGRAPHIC PRINTERS

Louis B. Butterfield, Plainfield, and John H. Sulzer, Union Beach, N. J., assignors to Western Electric Company, Incorporated, New York, N. Y., a corporation of New York Application September 21, 1950, Serial No. 186,008

19 Claims. (Cl. 101—93)

This invention relates to a control system for electrophotographic reproduction or electrostatic printing and more particularly to such a system utilizing record controlled means for comparing the numerical designation of a material, such as a microfilm to be reproduced with the material designation data on the record means so that the reproducer will not operate unless the material designation data on the record means is identical with the numerical designation of the material to be reproduced.

The system also utilizes the record control means to simultaneously control a predetermined number of copies to be reproduced and set up a selectively movable character bearing means for printing a permutation of characters representative of the record means data on each copy reproduced.

The recent introduction of the use of electrophotographic printing, while presenting a great theoretical improvement over the existing printing methods, is considerably limited in commercial application because of the complete lack of a system or apparatus which can utilize the best qualities of the electrophotographic process and yet complete commercially with present high speed printers. The present devices for electrophotographic printing are manually operated and require a large number of independent manually performed steps in order to produce a single printed copy, and no means is provided to print copies of more than one desired object in an automatically controlled sequence.

Consequently, an object of this invention is to provide a record controlled image reproducer which is started and stopped automatically under the control of a circuit responsive to a record means, said circuit also controlling the sequential positioning of a plurality of adjustable character means for recording indicia on each copy reproduced.

Another object of the invention is to provide a plurality of stepping relays sequentially moved into predetermined positions under the control of the record means for starting and stopping the electrostatic reproducer in response to indicia on the record means.

Another object is to provide a control circuit for a reproducer wherein the control circuit initiates operation thereof for a predetermined number of cycles and simultaneously aligns a plurality of character bearing means for printing a predetermined permutation of characters on each of a series of reproduced copies.

In accordance with these and other objects, an embodiment of the invention comprises a plurality of self-indexing rotary stepping relays which are sequentially indexed into predetermined positions under the control of punched tapes or record cards bearing the desired controlling data or indicia. A plurality of switches or contacts are provided on each stepping relay and certain ones are closed when particular relays are stopped at the desired predetermined position. A first group of these stepping relays control through their contacts the starting of the printer or reproducer conjointly with the operation of a sensing means controlled by indicia on the material to be reproduced. A second group of these stepping relays establishes a counting circuit so that the reproducer is stopped after a predetermined number of copies have been printed. Each of a plurality of sprocket wheels individually engaging one of a plurality of endless character stenciling belts is directly connected to different shafts of the stepping relays so that the movement of the relay shafts into their respective predetermined positions rotates a permutation of stencil characters into alignment at a printing position. This permutation of the aligned characters is representative of the indicia or data on the record card or tape and is printed on each reproduced copy so as to identify with regard to any desired data such as order number, image number, date, etc.

Other objects and features of the invention will be apparent from a consideration of the following detailed description in conjunction with the accompanying drawings wherein.

Figures 1, 2, 3:
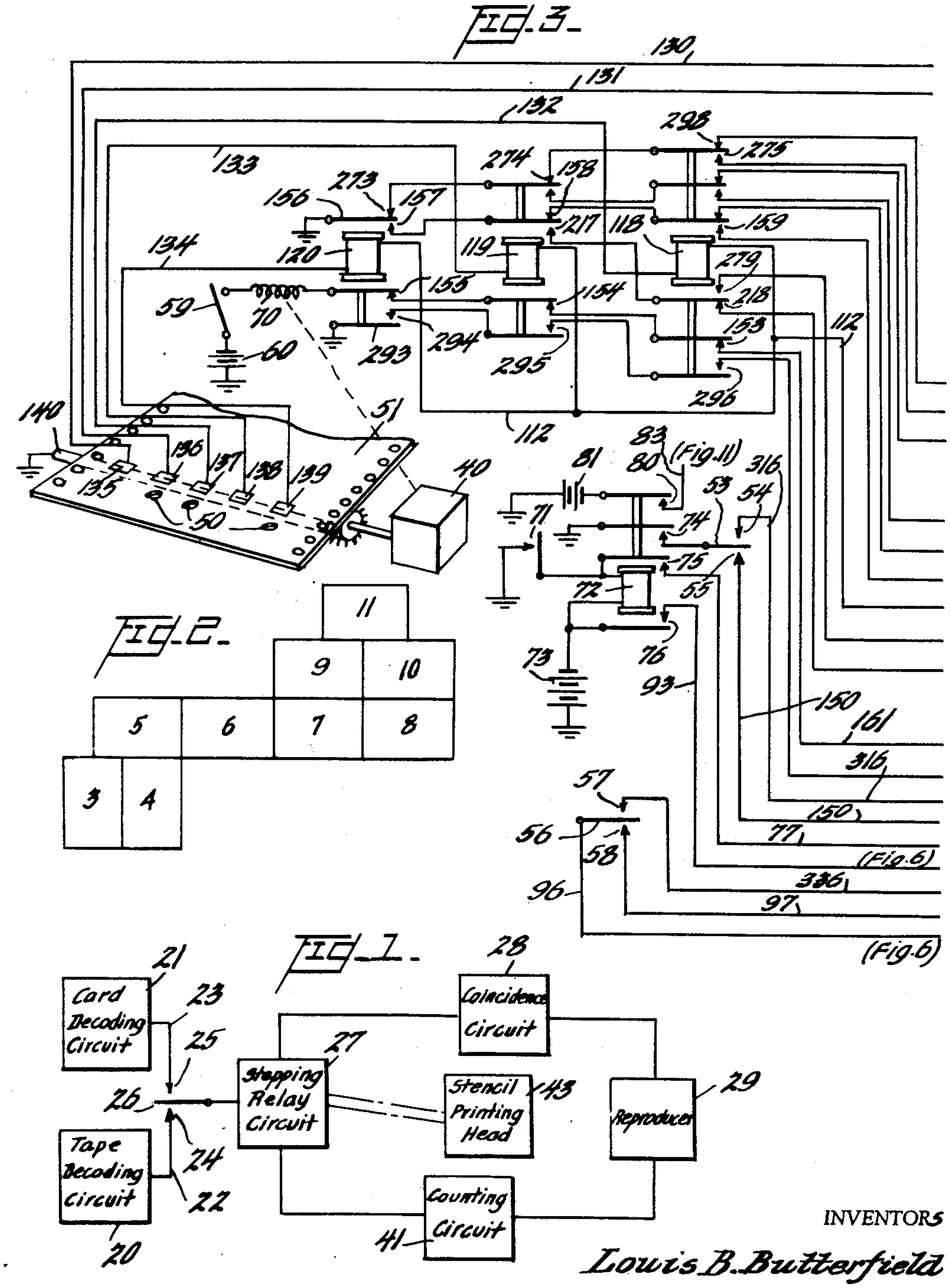
Fig. 1 is a block diagram of a system for controlling the operation of an automatic start-stop electrostatic printer or reproducer embodying the invention.
Fig. 2 is a schematic diagram of the manner in which Figs. 3 to 11 of the drawings are positioned adjacent each other to form a complete circuit diagram of the electrical controls for the system of Fig. 1.
Figs. 3 to 11 are circuit diagrams including most of the elements of the reproducing system diagrammatically indicated in Fig. 1.

Referring now to the drawings, wherein like reference numbers indicate the same elements throughout the several views, and more particularly to Fig. 1 of the drawings, a tape controlled decoding circuit 20 and a punched card controlled decoding circuit 21 are connected through conductor cables 22, 23 to contacts 24 and 25, respectively, of a two position switch 26. Each of the cables 22 and 23 contains a plurality of conductors and each conductor is designated to represent a different alphabetic, numerical or punctuative character. Either the card decoding circuit 21 or the tape decoding circuit 20, whichever is used, connects ground to a particular single conductor in either the cable 22 or 23 in response to a predetermined permutation of holes in the card or tape, which pemutation is representative of the alphabetic, numerical, or punctuative character designation of the conductor to which ground is connected.

The switch 26 is moved to close a circuit through either contact 24 or 25 so as to connect each of the designated conductors in either the cable 22 or 23 in parallel with a plurality of banks of like designated circularly arranged contacts or switches on a series of stepping relays in a relay circuit 27.

A first group of the plurality of relays or automatic selectors in circuit 27 is indexed into the predetermined positions on the circularly arranged contacts by either the tape or card decoding circuits 20 or 21 by means of an internal hunting arrangement so as to register a predetermined number representative of the designation of the material to be reproduced on a coincidence circuit 28. The coincidence circuit 28 is also under the control of a sensing means in a reproducer 29, which sensing means is responsive to indicia on the material to be reproduced representing the numerical designation of this material. The circuit 28 compares the two numerical designations and starts the reproducer 29 only when the designations are identical, thus preventing operation of the reproducer 29 unless the material in reproducing position is identical with the material which it is desired to reproduce, as indicated by the indicia on the tape or card record means.

A second group of relays or automatic selectors in the circuit 27 is indexed into predetermined positions to set up a counting circuit 41 which is responsive to each printing movement of the reproducer 29. When the predetermined number of copies of the material to be reproduced has been printed, which number is determined by the predetermined position of the second group of relays in circuit 27, the counting circuit 41 ejects the material which has been reproduced.

If, at this time, there is no more material to be printed, the reproducer 29 is stopped under the control of the counting circuit 41. However, if there is additional material to be printed, the ejection of the material, copies of which have been printed, serves to release all of the relays in the circuit 27 so that they are once again sequentially indexed into predetermined positions in response to indicia on either a new record card or a new sequence of punched hole permutations on the tape. The new predetermined positions of the relays in circuit 27 controls the reproduction of copies of a second material.

Circuit 27 continues to control the reproducer 29 in response to the indicia on either the record cards or tape until such time as the last material to be printed is ejected from the reproducer 29 and, at this time, the counting circuit 41 stops the reproducer 29 and releases all of the stepping relays in circuit 27 to condition said circuit for receipt of another series of control grounds from the cables 22, 23 when the next material is to be reproduced.

A stencil printing head 43, directly connected to the plurality of relays in circuit 27, is selectively adjustable to print the same data on each copy made by the reproducer 29 as that which is represented by the indicia sensed by either the card decoding circuit 21 or the tape decoding circuit 20. As the plurality of relays in circuit 27 is sequentially indexed into predetermined positions representative of certain data on the record means, the printing head 43 is likewise selectively rotated to place stencil characters representative of said record data in alignment in a stenciling position adjacent the path of movement of the copies from the reproducer 29.

*Tape decoding circuit*

The tape decoding circuit 20 (Fig. 1) grounds a particular designated conductor 52 (Fig. 4) in the cable 22 in response to a predetermined permutation of holes 50 (Fig. 3) in a record control tape 51, which conductor 52 is designated by a character represented by the permutation of holes 50 in the tape 51. Referring now to Fig. 3 of the drawings, a switch 53 having two contacts 54, 55 and a second switch 56 having two contacts 57, 58 are provided for selecting either the tape or the card controlled decoding circuits 20, 21 (Fig. 1) for use in actuating the relay circuit 27 (Fig. 1). In order to use the tape decoding circuit (Fig. 1), switch 53 (Fig. 3) is actuated to close contact 55, and switch 56 is actuated to close contact 58. A switch 59 connects grounded battery 60 to a clutch operating solenoid 70 and is closed by an operator when it is desired to use the tape decoding circuit 20 (Fig. 1).

Operation of the tape decoding circuit 20 is initiated by manually closing a start key 71 to energize a start relay 72 from grounded battery 73. Operation of start relay 72 closes contacts 74, 75, 76 and 80 thereof. Contact 75, when closed, connects grounded battery 73 through the operating coil of the relay 72 through a conductor 77, a contact 78 of a release switch 79 (Fig. 4), a conductor 90 and a normally closed contact 91 of an "end of cycle" relay 92 to ground. This circuit holds the relay 72 operated after the start key 71 is released to remove its ground from the operating coil of relay 72.

Contact 80, when closed, connects a battery 81 to the operating coil of a relay 82 (Fig. 11) through a conductor 83 and a normally closed limit switch 85. The other side of relay 82 is connected to ground so that operation of the start relay 72 operates relay 82 to close a contact 84 associated therewith.

Figure 4:
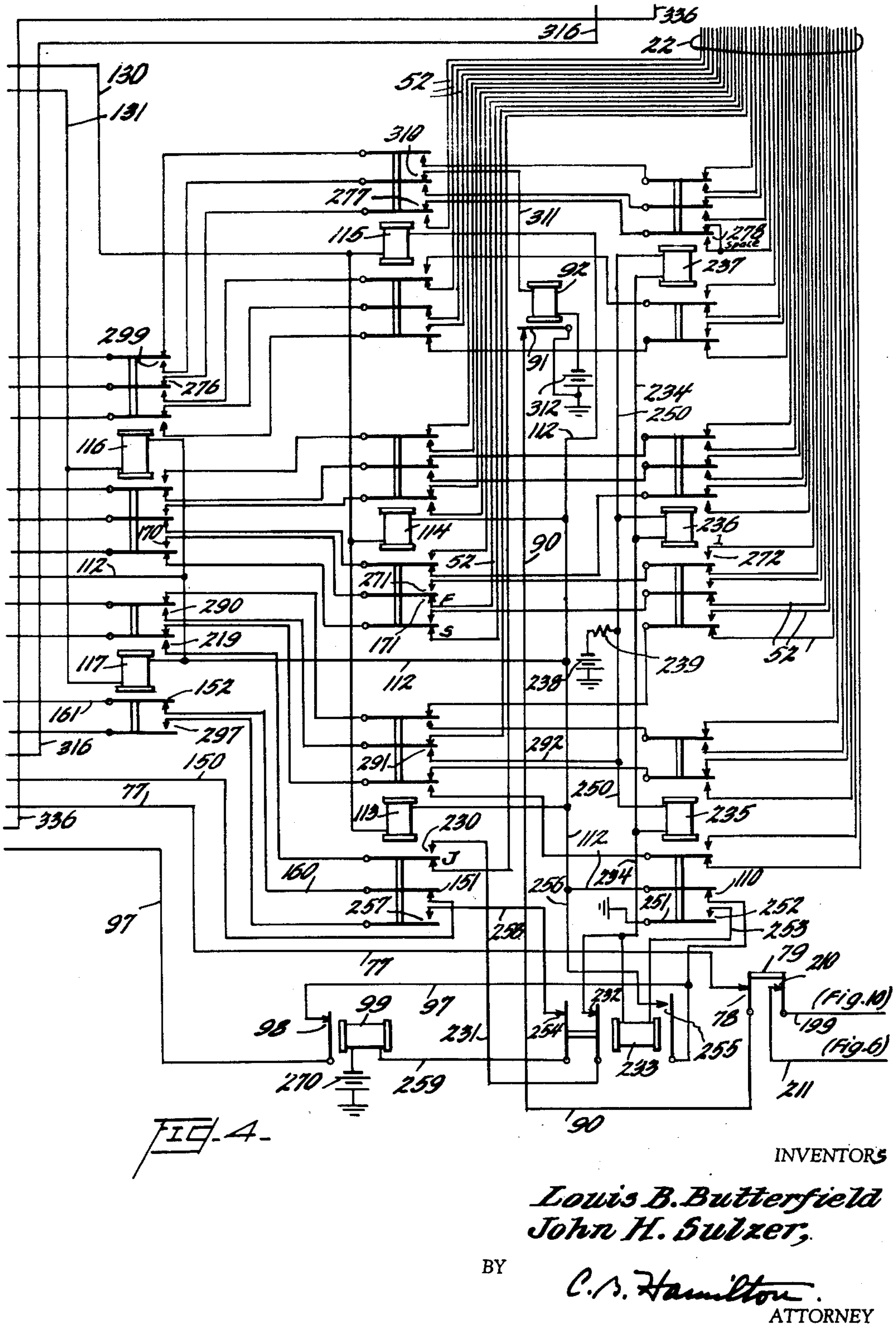

Contact 76, when closed, connects grounded battery 73 through a conductor 93, a contact 94 of a relay 95 (Fig. 6), a conductor 96 (Figs. 3 and 6), the contact 58 of switch 56, a conductor 97, a contact 98 of a "letters" relay 99 (Fig. 4), a contact 110, and thence through a conductor 112 to the operating coils of a plurality of decoding relays 113, 114, 115, 116, 117, 118, 119, and 120 (Figs. 3 and 4). The other sides of the operating coils of the decoding relays 113 to 120, inclusive, are connected through conductors 130, 131, 132, 133, 134 to a plurality of tape sensing brushes 135, 136, 137, 138 and 139, respectively.

Contact 74, when closed, completes a circuit from ground through contact 55 of switch 53, a conductor 150, a contact 151 of the decoding relay 113 (Fig. 4), a conductor 160, a contact 152 of the relay 117, a conductor 161, a contact 153 of the relay 118 (Fig. 3), a contact 154 of the relay 119, a contact 155 of the relay 120, the tape transmitter clutch solenoid 70, switch 59, to grounded battery 60. This circuit energizes a clutch of a tape transmitter 40 to move the tape 51 forward one step so that a permutation of holes 50 representing a particular character is positioned beneath the plurality of sensing brushes 135, 136, 137, 138 and 139.

Assuming a permutation of holes 50 as shown in Fig. 3, a grounded plate 140 positioned directly below the sensing brushes and the tape 51 applies ground to the permutation of brushes 136, 137, and 139 through the holes 50. Brush 136 connects ground through the conductor 131 to the operating coils of relays 116, 117 and thence to battery 73 through conductor 112, contact 110, conductor 97, contact 98, conductor 97, contact 58 of switch 56, conductor 96, contact 94 (Fig. 6), conductor 93, and contact 76 (Fig. 3). Brush 137 completes a circuit from ground to battery 73 through the conductor 132, the operating coil of relay 118 and the same circuit described in conjunction with the relays 116 and 117. Brush 139 completes a circuit from ground to battery 73 through the conductor 134 to the operating coil of relay 120 and thence to battery 73 through the remainder of the battery circuit described in conjunction with the operation of the relays 116, 117 and 118.

The operation of relays 116, 117, 118 and 120 completes a circuit from a grounded arm 156 of the relay 120, through a contact 157 thereof, a contact 158 of relay 119, a contact 159 of the relay 118, a contact 170 of the relay 116, a contact 171 of the relay 114 to a conductor 52 of the cable 22. This conductor is designated "F" as shown by the character positioned adjacent the contact 171 of relay 114. The particular designation shown for the conductor 52 is representative of the data or indicia on the tape 51, which indicia comprises the holes 50 punched in the tape 51 so as to ground sensing brushes 136, 137 and 139.

Each of the conductors 52 in the cable 22 is connected to a like designated conductor 313 from the card decoding circuit 21 (Fig. 5) to form a cable 172. However, it is to be noted that the tape decoding circuit 21 provides three (3) punctuative character designations; i. e., a period (.), a dash (—), and a diagonal (/), which are not provided by the card decoding circuit 21 so that there are three (3) more conductors 52 than conductors 313. Each of the conductors in the cable 172 is parallelly connected to like designated contacts 173 on each of the plurality of stepping relays in Figs. 6, 7 and 8 through a plurality of conductors 174.

When decoding relays 116, 117, 118 and 120 operate to ground a designated conductor 52, the relays 117, 118 and 120 also open the contacts 152, 153, and 155 of the transmitter clutch energizing circuit. Interruption of this circuit disconnects the drive of the tape transmitter 40 so that the permutation of holes 50 remains under the sensing brushes 136, 137 and 139.

Figure 14:
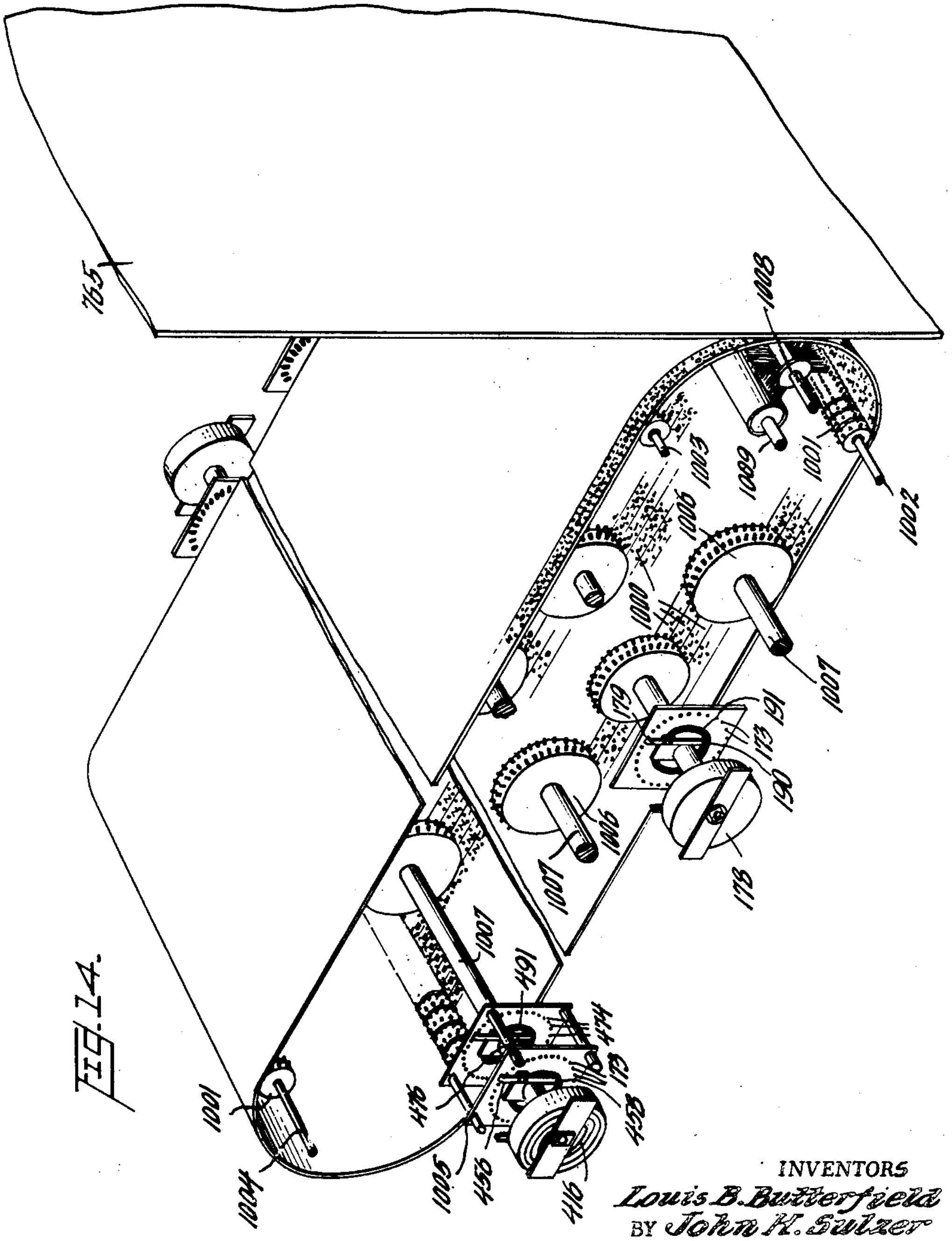
Fig. 14 is an isometric view of the character printing head controlled by the circuit shown in Figs. 3 to 11, inclusive.

The operation of the start key 71 and subsequent operation of start relay 72 connects battery 73 through contact 76, conductor 93 (Figs. 3 and 6), contact 94, a conductor 96, a contact 175 of the relay 95, a conductor 176, a contact 177 of a self indexing stepping relay 178 to the grounded operating coil thereof. This stepping relay continuously rotates its associated shaft 1007 (Fig. 14) carrying a pair of electrically interconnected selector arms 179, 190 (Fig. 6) to sequentially move the arms 179, 190 over a plurality of circularly arranged contacts 173 and to complete a circuit between each of the contacts 173 and a circular conducting ring 191. The ring 191 is connected through a conductor 192, a contact 193 of a relay 194, a conductor 195 through the operating coil of relay 95 to the battery conductor 93.

Whenever the selector arm 179 is stepped into a position upon a contact 173 grounded through one of the plurality of conductors 174 connected in parallel with the conductors of the cable 172, a circuit is completed from the grounded conductor 52 through cables 22 and 172, conductor 174, contact 173, arms 179, 190, ring 191, conductor 192, contact 193, conductor 195, the operating coil of relay 95, to the battery conductor 93. This circuit operates the relay 95 to close a contact 196 and open contacts 94 and 175.

Contact 196 in closing connects ground from a normally closed grounded contact 197 of relay 198 (Fig. 10) through a conductor 199 (Figs. 4 and 10), a contact 210 of release switch 79 (Fig. 4), a conductor 211, contact 196 of relay 95 to the operating coil of the relay 194.

The removal of the energization of the stepping relay 178 by opening contact 175 stops the rotation of the selector arms 179 and 190 thereof so that they remain in position on the "F" designated contact 173 grounded by the decoding circuit 20.

The removal of battery 73 from conductor 96 by opening contact 94 breaks the energizing circuit of the relays 116, 117, 118, and 120 and thereby closes contacts 152, 153 and 155 to complete the energizing circuit of the tape transmitter clutch solenoid 70. The energization of the tape transmitter clutch solenoid 70 operatively connects the driving unit of the tape transmitter 40 to the tape indexing means so that a new permutation of holes 50 is moved into position between the sensing brushes 135 to 139, inclusive, and the grounded plate 140.

The release of the decoding relays 116, 117, 118 and 120 also opens the circuit grounding the conductor "F" extending through the contacts 157, 158, 159, 170 and 171 so that ground is removed from the circuit extending from the formerly grounded "F" contact 173 through the selector arms 179, 190, ring 191, conductor 192, contact 193 and the operating coil of the relay 95 to grounded battery 73 (Fig. 3) through the conductor 93 and contact 76. However, relay 95 remains operated since ground is provided thereto from contact 197 (Fig. 10) through the operating coil of relay 194 and contact 196, now closed.

The removal of ground from contact 193 removes the ground shunt extending therethrough and around the operating coil of the relay 194 so that relay 194 is operated from battery conductor 93 through the operating coil of relay 95, conductor 195, the operating coil of relay 194, contact 196, and thence to grounded conductor 211. Operation of relay 194 closes a contact 212 and opens contact 193.

The opening of contact 193 prevents the release of relay 794 in the event that the contact designated as "F" is grounded by a subsequent permutation of holes 50.

Contact 212, in closing, connects a grounded battery 213 through a conductor 214, a contact 215 of a relay 216 to the battery conductor 96. This re-energization of battery conductor 96 once again provides battery to the operating windings of the decoding relays 113 to 120, inclusive.

Assuming that the next conductor 52 to be grounded by the decoding circuit 20 is designated by either a numerical or a punctuative character, a selective operational "stunt" code comprising a permutation of holes 50 grounding brushes 135, 136, 138 and 139 is moved into sensing position. This permutation of holes grounds the brushes 135, 136, 138 and 139 to energize the decoding relays 113 to 117, inclusive, 119, and 120 through the conductors 130, 131, 133 and 134.

Operation of these relays completes a circuit from grounded switch arm 156 through contact 157, a contact 217 of relay 119, a contact 218 of relay 118, a contact 219 of relay 117, a contact 230 of relay 113, a conductor 231, a normally closed contact 232 of relay 233 to a conductor 234 which interconnects one side of the operating coils of "figures" decoding relays 235, 236 and 237. The other side of the operating coils of the relays 235, 236, and 237 is connected to a grounded battery 238 through a resistor 239 and a conductor 250. Completion of the circuit from the grounded contact 232 through the operating coils of the figures relays 235, 236 and 237 to the grounded battery 238 operates these three relays to close a new permutation of contacts associated therewith.

The contact 110 is opened by the operation of relay 235 and breaks the battery circuit energizing the plurality of decoding relays 113 to 120, inclusive, so that the contacts previously closed thereby are now opened.

The operation of relay 235 also closes a grounded switch arm 251 to a contact 252 associated therewith which completes a circuit extending from the grounded battery 238 through the resistor 239, conductor 250, the parallelly connected operating windings of the figures relays 235, 236 and 237, conductor 234, the operating coil of relay 233, a conductor 253, contact 252, and grounded switch arm 251. This circuit operates relay 233 to open contacts 254, 232 and to close a contact 255. Although contact 232, in opening, breaks the ground circuit to the operating coil of the relays 235, 236 and 237, they remain operated from the ground provided by contact 252.

The contact 255, in closing, connects battery from the conductor 97, through contact 255 and a conductor 256 to the conductor 112 which provides battery to the operating windings of the decoding relays 113 to 120, inclusive. Contact 254, in opening, breaks the circuit extending from a contact 257 of the relay 113 through a conductor 258, the contact 254, a conductor 259 and thence through the operating coil of the letters relay 99 to a grounded battery 270.

Also, the transmitter clutch energizing solenoid 70 is again actuated by the closure of contacts 151, 152, 154, 155 to advance a third permutation of holes into position between the sensing brushes 135 to 139, inclusive, and the grounded plate 140.

The completion of the battery circuit to the operating windings of the decoding relays 113 to 120, inclusive, by closing contact 255 allows these relays to operate in response to the third permutation of holes 50 moved into position beneath the sensing brushes 135 to 139, inclusive.

Assuming that a conductor 52 designated by the numerical character "1" is to be grounded, relays 120, 118, 117, 116, 115, 114 and 113 are operated from grounded plate 140 through sensing brushes 135, 136, 137, 139 and conductors 130, 131, 132 and 134, respectively. Operation of these four relays completes a circuit from grounded switch arm 156, through contact 157, contact 158, contacts 159, 170, a contact 271 of the relay 114 to a contact 272 of the "figures" relay 236. This circuit grounds a particular conductor 52 designated by the numerical character "1" as represented by the character appearing adjacent the contact 272 in Fig. 4 of the drawings.

As explained hereinbefore in conjunction with the description of the first permutation of holes 50 representing the alphabetic character "F," one of the stepping relays in the circuit 27 rotates its associated selector arm until the particular contact 173 grounded by the conductor 52 and designated by the numerical character "1" is reached. At this time, the relays associated with this particular stepping relay break the battery circuit to the plurality of decoding relays 113 to 120, inclusive, and subsequently transfer battery energization to the next proceeding stepping relay stage whereupon the decoding relays 113 to 120, inclusive, are once again provided with battery through the conductor 112. Also, the completion of the circuit through the selector arms from the grounded contact 173 designated by the numerical character "1" re-establishes the ground circuit to battery 60 through the tape transmitter clutch solenoid 70 so that once again a new permutation of holes 50 is moved into position between the grounded plate 140 and the plurality of sensing brushes 135 to 139, inclusive.

If it is desired to provide a "space" in the printing head 43 between the numerical character "1" and the next following character, a single hole 50 is moved into the sensing position so as to ground sensing brush 137. Grounded sensing brush 137 completes a circuit extending from grounded plate 140 through the conductor 132 to the operating coil of the relay 118 and thence to battery conductor 112 so as to operate this relay. Relay 118, in operating, completes a circuit from the grounded switch arm 156 through a contact 273 thereof, a contact 274 of the relay 119, a contact 275 of the relay 118, a contact 276 of the relay 116, a contact 277 of the relay 115 and a contact 278, now closed, of the "figures" relay 237 whereby a particular conductor 52 designated by "space" is grounded.

As explained above in conjunction with the sensing of the first and third permutation of holes 50, another stepping relay in the circuit 27 rotates its selector arm into position on a grounded contact 173 connected to the "space" designated conductor in the cable 172 to remove energization from the plurality of decoding relays 113 to 120, inclusive, to stop the rotating selector arm on the grounded "space" contact 173, to transfer the energization to the next proceeding stepping relay in the circuit 27, and to energize the tape transmitter clutch solenoid 70 to move a new permutation of holes 50 into position beneath the plurality of sensing brushes 135 to 139, inclusive.

In the event that the next conductor 52 which it is desired to ground is designated by an alphabetical character and not a numerical or punctuative character, a second operational selective "stunt" code comprising holes 50 positioned in the tape 51 so as to ground all of the sensing brushes 135 to 139, inclusive, is moved into sensing position. Accordingly, all of the decoding relays 113 to 120, inclusive, are operated so as to close a circuit extending from grounded switch arm 156 through the contacts 157, 217, a contact 279 of the relay 118, a contact 290 of the relay 117, a contact 291 of the relay 113, and thence through a conductor 292 to the conductor 250. This circuit provides a ground shunt around a battery 238 so as to deprive the operating coils of the "figures" decoding relays 235, 236, and 237 and the "figures" relay 233 of energization so that these relays release.

The release of relays 235 and 233 completes a battery circuit from the conductor 97 through the contact 110 to the relay 235 by closing contact 110 and opening contact 255.

A grounding circuit completed by the release of relay 233 connects a grounded switch arm 293 of the relay 120 (Fig. 3) through a contact 294 thereof, a contact 295 of the relay 119, a contact 296 of the relay 118, a contact 297 of the relay 117, contact 257, conductor 258, contact 254 of the relay 233, conductor 259 and thence through the operating coil of "letters" relay 99 to grounded battery 270.

This circuit energizes the letters relay 99 to open the contact 98. The opening of contact 98 breaks the battery circuit to the plurality of decoding relays 113 to 120, inclusive, so that these relays are all released. Release of the plurality of the decoding relays once again completes the circuit energizing the tape transmitter clutch solenoid 70 so that a sixth permutation of holes 50 representing an alphabetical character is moved into position beneath the plurality of sensing brushes 135 to 139, inclusive. The release of the plurality of decoding relays 113 to 120, inclusive, also breaks the ground circuit extending from the grounded switch arm 293 through the plurality of contacts 294, 295, 296, 297 and 254 so that the letter relay 99 is released to close the contact 98 and to provide battery to the operating coils of the plurality of decoding relays 113 to 120, inclusive.

The sixth permutation of holes 50, in this instance representing an alphabetic character, grounds a predetermined permutation of sensing brushes 135 to 139, inclusive, so that a predetermined number of the decoding relays 113 to 120, inclusive, are operated to close a grounding circuit from the grounded switch arm 156 through the plurality of contacts associated with the relays 113 to 120, inclusive, and 235, 236, 237. It is apparent that the hereinabove described method of sequentially indexing each of the plurality of relays in the circuit 27 into predetermined positions is progressively continued until such time as all of the relays in circuit 27 have been indexed into a desired position under the control of the permutation of holes 50 in the advancing punched tape 51.

After the predetermined number of copies of the material have been made by the reproducer 29, the relay 198 (Fig. 10) is operated to open contact 197. The opening of contact 197 removes ground from all of the relays associated with the stepping relays in circuit 27 to thereby condition circuit 27 for receipt of a new sequence of ground pulses on the conductors in the cable 172. It is apparent that the plurality of stepping relays in circuit 27 may be sequentially indexed into predetermined positions under the control of a second sequence of permutations of holes 50 so as to control the reproduction of copies of a second material such as a microfilm in the same manner as that described for the first material.

When the last of the plurality of materials such as microfilm which are to be printed and has been ejected from the reproducer 29, the tape transmitter clutch solenoid 70 is energized to advance a final permutation of holes 50 into sensing position beneath the brushes 135 to 139, inclusive. A single hole 50 representing the "end of cycle" operational selective "stunt" code operates relays 116 and 117 through the brush 136 and the conductor 131 to close a circuit from grounded switch arm 156 through contacts 273, 274, a contact 298 of the relay 118, a contact 299 of the relay 116, a contact 310 of the relay 115, a conductor 311 and thence to a grounded battery 312 through the operating coil of the relay 92.

Completion of this energizing circuit operates the relay 92 to open the contact 91 thereof. Contact 91, when open, breaks the holding circuit of the start relay 72 comprising grounded contact 91, conductor 90, contact 78, conductor 77 (Figs. 3 and 4), contact 75, the operating coil of relay 72 and grounded battery 73.

Start relay 72, when released, opens contacts 74, 75, 76 and 80 to condition the circuit for operation when the start key 71 is once again actuated by the attendant.

*Card decoding circuit*

The card decoding circuit 21 (Fig. 5) which may be used in place of the tape decoding circuit 20, grounds a particular designated conductor 313 in response to a permutation of holes 314 in a punched card 315, which permutation of holes 314 is representative of the numerical or alphabetical character designation of the conductor 313 to be grounded.

In order to utilize the card decoding circuit 21 in place of the tape decoding circuit 20, the switch 53 is actuated to close the contact 54 and the switch 56 is actuated to close contact 57. Inasmuch as the tape transmitter 40 will not be used, switch 59 is manually opened to remove energization from the tape transmitter clutch solenoid 70. The operation of the card decoding circuit 21 is initiated in the same manner as the tape decoding circuit 20 by manually closing the start key 71 to operate the start relay 72 from grounded battery 73.

Relay 72, in operating, closes contacts 74, 75, 76 and 80. Contact 75, in closing, completes the holding circuit of the relay 72 extending from the grounded battery 73, the operating coil of relay 72, contact 75, conductor 77 (Figs. 3 and 4), contact 78, conductor 90 and thence to ground through normally closed contact 91. This holding circuit maintains the start relay 72 in an operating condition even though the manual start key 71 is released.

Contact 80, in closing, operates relay 82 (Fig. 10) to close contact 84.

Closing contact 74 provides ground through contact 54 of switch 53, a conductor 316 (Figs. 3, 4 and 5), to a normally open contact 317 of a relay 318 (Fig. 5) and to the operating coil thereof through a conductor 319, a normally closed contact 330 of a relay 331, contacts 332, 333, and 334 and a conductor 335.

Contact 76, in closing, connects grounded battery 73 through the conductor 93, contact 94 (Fig. 6), conductor 96, contact 57 of switch 56 (Fig. 3), a conductor 336 (Figs. 3, 4 and 5) to the operating coils of a plurality of card decoding relays 337, 338, 339, 340, 341, and 342, and to the operating coils of the relays 318 and 331. The ground side of the operating coils of the three groups of card decoding relays 337, 338; 339, 340; 341, 342; are connected through conductors 343, 344, 345 to sensing brushes 350, 351, 352, respectively. The ground side of the operating coil of the relay 331 is connected to a plurality of sensing brushes 353, 354, 355, 356, 357, 358, 359, 360, 361, through conductors 370, 371, 372, 373, 374, 375, 376, 377, 378, respectively, a plurality of resistors 379 and a conductor 390.

Assuming that the card 315, which is positioned on a grounded indexing plate 391, is in position beneath the plurality of sensing brushes 350 to 361, inclusive, so that none of these brushes are grounded, the application of battery 73 through the hereinabove described circuit to the operating coil of the relay 318 causes the energization thereof. Operation of relay 318 closes a contact 392 and the contact 317 associated therewith.

Contact 317, in closing, completes a circuit from a grounded battery 393 through the operating coil of a card indexing relay 394, a conductor 395, the contact 317, conductor 316 (Figs. 3, 4 and 5), contacts 54 and 74 to ground. This circuit operates the relay 394 to advance an indexing arm 396 associated therewith so that release of the relay 394 permits the arm 396 thereof to advance the plate 391 and card 315 thereon into the next sensing position against the pull of a spring 400.

A retaining pawl 580 extends into a notch on indexing plate 391 to prevent return spring 400 from returning indexing plate 391 to the first position while relay 394 is energized and indexing arm 396 is disengaged from notches 402. A relay 572 (Fig. 8), which operates when all the stepping relays in circuit 27 are indexed into their predetermined positions, connects ground through a contact 591 and a conductor 592 to operate a relay 590 (Fig. 5) from a grounded battery 581. Relay 590, operated, withdraws the retaining pawl 580 from the indexing notch 402 and thereby allows spring 400 to return the indexing plate 391 to the first sensing position.

The relays in the card decoding circuit 21 are not energized by the return of the card 315 to the first sensing position since battery is disconnected from the conductor 336 by the completion of the indexing of the stepping relays in circuit 27.

Figure 5:
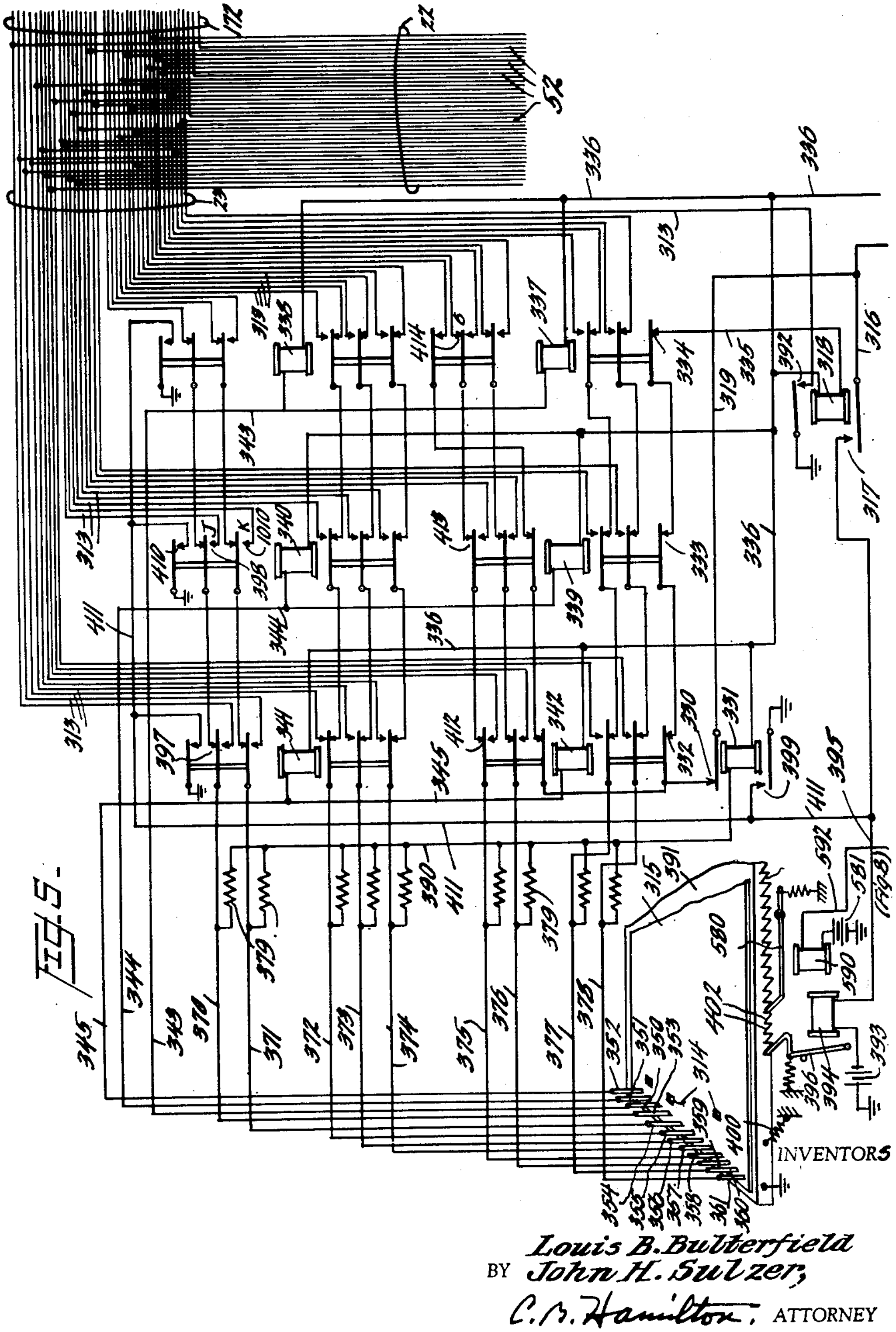
Figure 6:
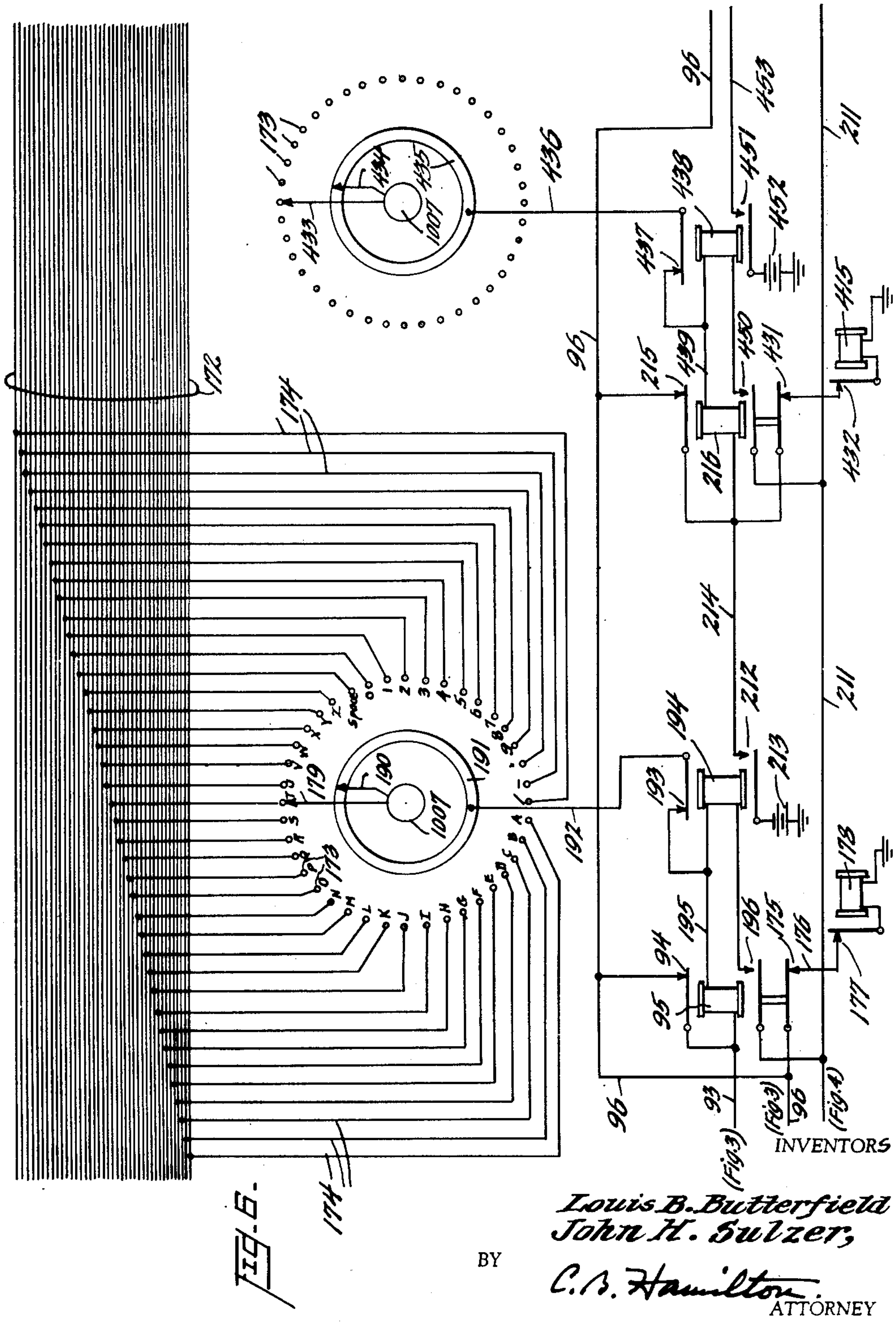
Figure 7:
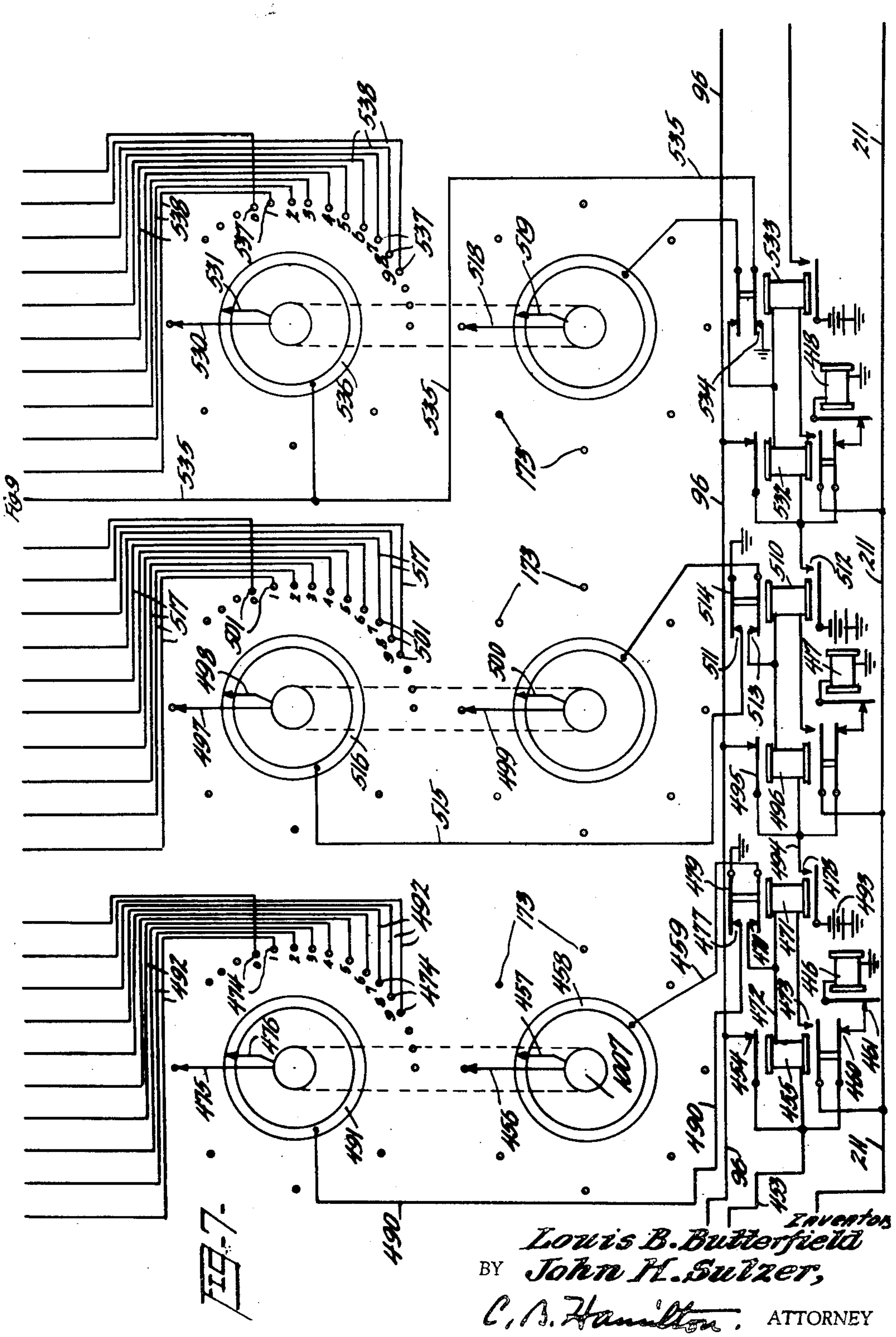

Contact 392, in closing, connects ground to a conductor 313 in the cable 23 which is designated by a "space" character. This conductor 313 is directly connected to a like designated conductor 52 in the cable 22 and grounds a like designated conductor in the cable 172 (Figs. 5 and 6). As explained in conjunction with the operation of the tape decoding circuit 20, each conductor in the cable 172 is connected in parallel with each of the like designated contacts 173 in the circuit 27 through conductors 174.

The stepping relay 178 (Fig. 6), which is energized by the application of the grounded battery 73 to the conductors 93 and 96, progressively advances its selector arms 179, 190 over the circularly arranged contacts 173 until the selector arm 179 thereof is positioned on the particular contact 173 designated by the "space" character. At this time, a circuit is completed from grounded contact 392 through the conductors 313 and 174, the selector arms 179 and 190, conducting ring 191, conductor 192, contact 193, conductor 195, and the operating coil of relay 95 to the battery conductor 93. This circuit energizes relay 95 to open contacts 94 and 175 thereof and closes the associated contact 196.

As previously explained in conjunction with the description of the operation of the tape decoding circuit 20, the opening of contact 94 removes battery 73 from the conductor 96, which in this instance is connected to the operating coils of the relays 337 to 342, inclusive, and 318, 331 (Fig. 5) through the switch 56 and conductor 336. The opening of contact 175 removes the energization of the stepping relay 178 (Fig. 6) so that the selector arm 179 thereof remains in position on the "space" contact 173. Contact 196, in closing, applies ground from the conductor 211 to the operating coils of the relays 95 and 194.

The removal of the energization of the relay 318 (Fig. 5) allows this relay to release and in doing so opens contacts 317 and 392. Contact 317, in opening, removes ground from the battery 393 so as to release the relay 394 and thereby permits the indexing arm 396 thereof to move the plate 391 and card 315 carried thereon into a second sensing position beneath the plurality of brushes 350 to 361, inclusive.

Opening grounded contact 392 removes ground from the "space" designated contact 173 so that the energizing circuit of relay 95 is broken. However, since ground is provided to the operating coil of the relay 95 (Fig. 6) through conductor 211, contact 196, and the operating coil of relay 194, the relay 95 remains operated, and the relay 194 becomes operated to open contact 193 and close the contact 212.

Contact 193, in opening, prevents the premature release of relay 194 in the event that the "space" contact 173 is grounded by a subsequent permutation of holes 314.

Contact 212, in closing, connects the grounded battery 213 to the conductor 96 so that once again the plurality of relays 337 to 342, inclusive, of the card decoding circuit 21 are provided with energization. In addition, battery 213 is connected to the operating coil of the second of the sequence of stepping relays in circuit 27 so that this relay progressively advances its selector arms over the plurality of circularly arranged contacts 173 associated therewith.

Assuming that the next conductor 313 in the cable 23 to be grounded is designated by the alphabetical character "J," the second permutation of holes 314 moved into position beneath the plurality of sensing brushes 350 to 361, inclusive, comprises holes 314 grounding brushes 351 and 353. Brush 351 completes a circuit from the grounded plate 391 through the conductor 344, the operating coils of relays 339 and 340 to the battery conductor 336 so that these relays are operated. Brush 353 connects grounded plate 391 through the conductor 370, a contact 397 of the relay 341, and a contact 398 of the relay 340 to the conductor 313 designated as "J" by the character appearing adjacent the contact 398.

Contact 410, closed by the operation of relay 340, connects ground through a conductor 411, the conductor 395, the operating coil of the advance relay 394 to grounded battery 393 for completing the energizing circuit of the relay 394 to actuate the indexing arm 396 into advanced position.

Grounding the brush 353 also completes a circuit from ground through the conductor 370, resistor 379, conductor 390, the operating coil of relay 331 to the battery conductor 336 whereby the relay 331 is operated to open the contact 330 and close a contact 399.

Contact 330, in opening, provides no useful function at this time inasmuch as the operation of the relay 339 opens the contact 333 to disconnect grounded conductor 319 from the operating coil of the relay 318 and thereby prevents its operation. The closure of contact 399 is also not of interest since ground is applied to battery 393 through the contact 410.

The ground applied to the conductor 313 designated by the character "J" in the bundle 172 is connected thereby to the like designated contact 173 in the bank of contacts 173 associated with the second stepping relay in the circuit 27. The continuing rotation of the selector arm controlled by the second stepping relay advances these arms into position on the grounded contact 173 designated by "J."

The completion of the circuit from the grounded conductor designated by "J" completes the circuit through the relay associated with the second stepping relay to recycle the card decoding circuit 21 in exactly the same manner as described in conjunction with the operation of the first stepping relay 178.

The removal of battery from the conductor 336 releases relays 331, 339 and 340. Relay 340, in releasing, removes ground from the operating coil of the advance relay 394 so that the indexing arm 396 thereof moves the grounded plate 391 and card 315 carried thereon into a third sensing position beneath the plurality of brushes 350 to 361, inclusive. The release of relay 340 and the advance of card 315 breaks the ground path to contact 398 from brush 353. Relay 331, in releasing, opens contact 399 and closes contact 330. Relay 339, in releasing, closes the contact 333 to complete the circuit from the grounded conductor 319 to the operating coil of the relay 318. However, relay 318 does not operate at this time since battery has been removed by the recycling operation of the relays associated with the second stepping relay in circuit 27.

The removal of ground from the particular conductor designated by "J" removes ground from the particular contact 173 so as to complete the recycling of the relays associated with the second stepping relay whereby battery is connected to both the third of the sequence of stepping relays in circuit 27 and to the operating coils of the plurality of relays 337 to 342 through the battery conductor 336.

Assuming that the figure "6" designates the next conductor 313 which it is desired to ground, the third sensing position on the card 315 which was previously moved into position beneath the plurality of brushes 350 to 361, inclusive, includes only a single hole 314 which grounds the brush 358. The ground on brush 358 is applied through the conductor 375, a contact 412 of the relay 342, a contact 413 of the relay 339 and a contact 414 of the relay 337 to the conductor 313 designated by the desired number "6."

The ground on brush 358 is also applied through the conductor 375, resistor 379, conductor 390 to operate the relay 331, which thereupon opens contact 330 and closes contact 399. Contact 330, in opening, breaks the ground circuit to the relay 318 so that it is not operated by the battery on conductor 336. Contact 399, in closing, provides ground to the operating coil of the advancing relay 394 to withdraw the indexing arm 396 thereof into position to advance the plate 391.

The selector arms of the third of the sequence of stepping relays in circuit 27 upon touching the contact 173 designated by the number "6" completes a circuit through the relays associated with said third stepping relay to remove the energization from the battery conductor 336 and to open the energizing circuit of said third stepping relay.

Removal of the energization from the battery conductor 336 releases relay 331 so that contact 399 thereof, in opening, releases the advancing relay 394 to index the plate 391 and card 315 carried thereon into a fourth sensing position.

As the card 315 is indexed into the fourth sensing position, ground is removed from the conductor designated by the number "6" to thereby complete the recycling of the relays associated with the third stepping relay in the circuit 27. The completion of the recycling of these relays once again energizes the next proceeding stepping relay in the circuit 27 and also applies battery to the relays 337 to 342, inclusive, in the card decoding circuit 21.

It is obvious that the remaining stepping relays in the circuit 27 can be indexed into predetermined positions representative of the sequence of permutation of holes 314 in the card 315 until such time as all of the relays have been adjusted. When all of the stepping relays in circuit 27 reach their predetermined positions, relay 572 (Fig. 8) operates to connect ground to the operating coil of relay 590 (Fig. 5). Relay 590, operated, withdraws the retaining pawl 580 from indexing notch 402 and, therefore, plate 391 is returned to the first sensing position by the spring 400. The stepping relays remain in the predetermined position to which they have been indexed until such time as the desired number of copies are printed by the reproducer 29. At this time, the contact 197 (Fig. 10) in the counting circuit 41 is opened to remove ground from the conductor 211 so that all of the relays associated with the stepping relays are released to condition circuit 27 for controlling the reproduction of a second material in response to permutations of holes 314 in a second punched card 351 which is automatically positioned on the plate 391 in place of the first punched card 315 by any of several well known card feeding mechanisms.

When all of the materials have been reproduced and it is desired to stop the operation of the entire control system, the release switch 79 is manually operated to open contacts 78 and 210. Contact 210, in opening, removes ground from the plurality of relays associated with the stepping relays in circuit 27 and in doing so releases all of the associated relays so as to place them in condition for the receipt of the next sequence of permutation of holes 314 on the next card 315 to be sensed. Contact 78, in opening, breaks the holding circuit for the start relay 72 so as to release this relay.

Relay 72, in releasing, opens contacts 74, 75, 76 and 80, and thereby completes the conditioning of the card decoding circuit 21 for use with a second group of punched cards 315.

*Stepping relay circuit*

The stepping relay or automatic selector circuit 27 (Fig. 1) includes a plurality of stepping relays which are sequentially indexed into predetermined positions under the control of either the tape decoding unit 20 or the card decoding circuit 21. A first group of the stepping relays selectively controls the coincidence circuit 28 so that the reproducer 29 is energized under the control of the predetermined position of the first group of stepping relays. A second group of stepping relays sets up the counting circuit 41 so as to control the ejection of the material or microfilm being reproduced after a predetermined number of printed copies have been made. The stepping relays in circuit 27 also selectively position a plurality of stencil belts engaged thereby so that the same character is moved into stenciling position as that which designates the particular contact in the first contact bank 173 grounded by either the tape or card decoding circuits 20, 21.

Circuit 27 includes a plurality of stepping relays 178, 415 (Fig. 6), 416, 417, 418 (Fig. 7), 419, 420 (Fig. 8), each of which has a first bank of circularly arranged contacts 173 associated therewith. Each contact 173 is designated by a particular character and is directly connected to a like designated conductor in the cable 172 through a conductor 174. Although only seven stepping relays are shown in the drawing, it is obvious that any number of similarly connected stepping relay stages may be inserted into the sequence between the relays shown in Fig. 6 and Fig. 7 and between the stepping relays shown in Fig. 7 and Fig. 8. The number of stepping relay stages is determined by the number of characters which it is desired to print on each copy made by the reproducer 29.

As explained in conjunction with the description of the card and tape decoding circuits 21, 20, the stepping relay 178 is energized by the manual closure of start key 71 to connect battery 73 to battery conductor 96 through conductor 93 and contact 94. Relay 178, being self-indexing, rotates its associated selector arms 179 and 180 until arm 179 is positioned upon a contact 173 which has been grounded by the action of either of the decoding circuits 20, 21, in response to a first permutation of holes representing an alphabetic, numerical, or punctuative character.

Selector arm 179 thereupon completes a circuit from grounded contact 173 to battery conductor 93 to operate relay 95. Relay 95, when operated, opens contact 94 to remove the battery from the decoding circuits, opens contact 175 to stop the rotation of relay 178 so that arm 179 remains in position on a grounded contact 173, and, closes contact 196 to provide ground from conductor 211 for the operating coils of relays 95 and 194.

The removal of battery from the decoding circuits advances the tape 51 or card 315 so that a new permutation of holes 50 or 314 is moved into sensing position. The movement of the tape 51 or card 315 removes ground from the grounded contact 173 so that relay 194, in operating, opens contact 193 to prevent a premature release of relay 194 in the event the same conductor in the cable 172 as before is subsequently grounded, and closes contact 212 to connect grounded battery 213 to battery conductor 96 through the contact 215 and conductor 214.

The application of battery 213 to conductor 214 also energizes stepping relay 415 through a contact 431 of the relay 216 and a contact 432 of the relay 415. Relay 415, when energized, rotates a pair of electrically interconnected selector arms 433, 434 associated therewith until arm 433 is positioned on the contact 173 grounded by the decoding circuits 20 or 21 in response to the second permutation of holes 50 or 314. Arm 433 thereupon completes a circuit energizing relay 216 from the grounded contact 173, arms 433, 434, a conducting ring 435, a conductor 436, a contact 437 of a relay 438, a conductor 439, the operating coil of relay 216, conductor 214, contact 212, and thence to the grounded battery 213.

Operation of relay 216 opens contact 215 to disconnect battery 213 from conductor 96, opens contact 431 to stop the rotation of the selector arms 433, 434, and closes a contact 450 to apply ground from conductor 211 to the operating coils of relays 216 and 438.

The removal of battery 213 from the decoding circuit advances the tape 51 or card 315 so that a third permutation of holes are moved into sensing position and ground is removed from selector arm 433. The removal of ground from arm 433 operates relay 438 to open contact 437 and to close a contact 451 whereby a grounded battery 452 is connected through contact 451, a conductor 453, a contact 454 of a relay 455 (Fig. 7) to the battery conductor 96. The re-establishment of the battery circuit through conductor 96 to the decoding circuit 20 or 21 energizes a pluraliy of relays therein to close a ground path to a conductor 52 or 313 designated by a predetermined character. Battery 452 also energizes the stepping relay 416 through conductor 453, a contact 460 of relay 455 and a contact 461.

Assuming that the designation of the conductor 52 or 313 to be grounded by the third permutation of holes 50 or 314 represents a digit in the hundreds denominational column of the numerical designation of the material or microfilm to be reproduced, the stepping relay 416 indexes a pair of selector arms 456 and 457 over the circularly arranged contacts 173 until such time as the contact 173 grounded by a conductor in the cable 172 is reached. At this time, a circuit is completed from the grounded contact 173 through the selector arms 456, 457, a conducting ring 458, a conductor 459, a contact 470 of a relay 471, a conductor 472, the operating coil of the relay 455 and thence to battery conductor 453. This circuit operates relay 455 to open the contacts 454 and 460 and to close a contact 473.

Contact 473, in closing, connects ground from the conductor 211 to the operating coil of the relays 455 and 471.

Contact 460, in opening, removes the energization of the stepping relay 416 so that the selector arm 456 associated therewith remains in position on the contact 173 grounded by the decoding circuits in response to the third permutation of holes. Contact 454, in opening, removes ground from the battery conductor 96 so that the relays in the decoding circuits 20 or 21 release and advance a fourth permutation of holes into sensing position. Relay 416, in addition to the first bank of contacts 173, has a second bank of circularly arranged contacts 474 which are progressively contacted by a pair of electrically interconnected selector arms 475, 476. The arms 475, 476 are secured to the same stepping relay shaft 1007 (Fig. 14) as the arms 456, 457 so that arms 456 and 475 are simultaneously positioned upon like designated contacts 173, 474, respectively.

As the fourth permutation of holes is moved into sensing position, the particular conductor in the cable 172 which was grounded by the third permutation of holes is disconnected from ground so that the relay 471 is operated in the same manner described in conjunction with the relays 194 and 438. Relay 471, in operating, opens the contact 470 and closes a pair of contacts 477 and 478 associated therewith.

Contact 470, in opening, prevents a premature release of the relay 471 in the same manner as described in conjunction with the operation of the relays 194 and 438.

Contact 477, in closing, connects a grounded switch arm 479 of the relay 471 through a conductor 490, a conducting ring 491, the selector arms 475 and 476, contact 474 to one of a plurality of conductors 492. The conductors 492 interconnect the contacts 474 of the stepping relay 416 with the hundreds denominational column control in the coincidence circuit 28.

Contact 478, in closing, connects a grounded battery 493 through a conductor 494, a contact 495 of a relay 496 to the battery conductor 96 to energize the relays in one of the decoding circuits 20, 21. Stepping relay 417 is also energized at this time by the battery 493.

The re-energization of the decoding circuit grounds a particular conductor in the cable 172 which is designated by a numerical character representative of the digit in the tens denominational column of the numerical designation of the material to be printed. The stepping relay 417 which was energized by the closure of contact 478 rotates two pairs of electrically interconnected selector arms 497, 498, and 499, 500 over the two banks of circularly arranged contacts 173 and 501, respectively, until such time as the selector arm 499 is positioned upon a particular contact 173 which is grounded by the fourth permutation of holes 50 or 314. At this time, the relay 496 is operated to stop the rotation of the stepping relay 417 and to remove the energization from the decoding circuits 20 or 21.

The removal of the decoding circuit energization advances a fifth permutation of holes 50 or 314 into sensing position and in doing so operates a relay 510 in the same manner as previously described in conjunction with the plurality of relays 194, 438 and 471. Relay 510, in operating, closes contacts 511, 512 and opens a contact 513. Contact 511, in closing, connects a grounded switch arm 514 of the relay 510 through a conductor 515, a conducting ring 516, the arms 497, 498, the contact 501, to one of a plurality of conductors 517, which conductors 517 are connected to the ten's denominational control of the coincidence circuit 28 in Fig. 9.

Contact 512, in closing, and contact 513, in opening, produce the same effect as that previously described in conjunction with the relay 471 associated with the stepping relay 416.

Figure 9:
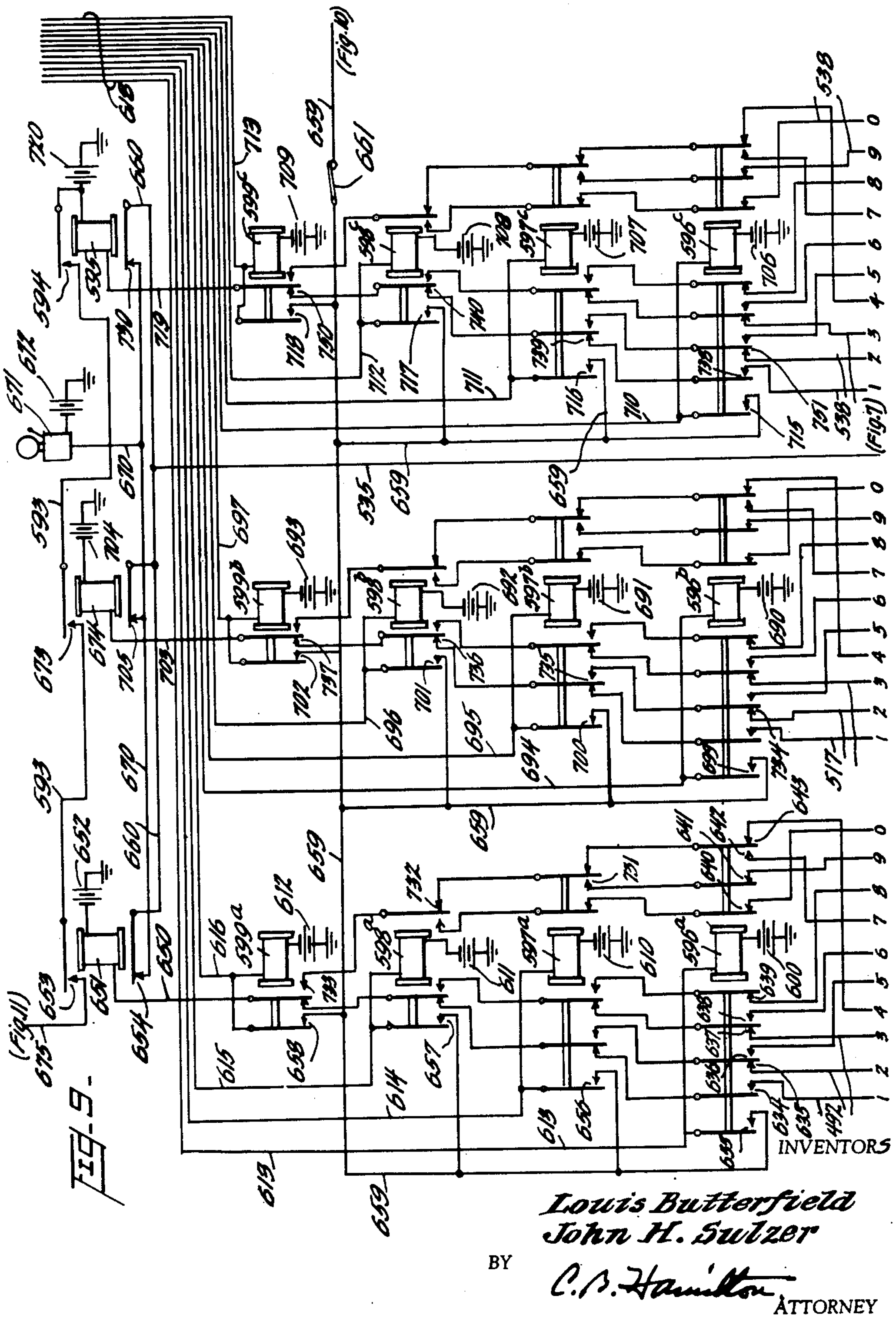

Stepping relay 418, which is energized by the closure of contact 512, rotates two pairs of electrically interconnected selector arms 518, 519 and 530, 531 until the arm 518 is in position on a contact 173 connected to the particular conductor in cable 172 which was grounded by the fifth permutation of holes 50 or 314 representing the desired digit in the units denominational column. Relays 532 and 533 are operated in the same manner as previously described so that a grounded contact 534, now closed, provides ground through a conductor 535, a conducting ring 536, the arms 530, 531, one of a bank of contacts 537 to one of a plurality of conductors 538 which are connected to the units denominational column control of the coincidence circuit 28 in Fig. 9. Conductor 535 also connects the grounded contact 534 to an alarm circuit in the coincidence circuit 28 (Fig. 9).

Figure 10:
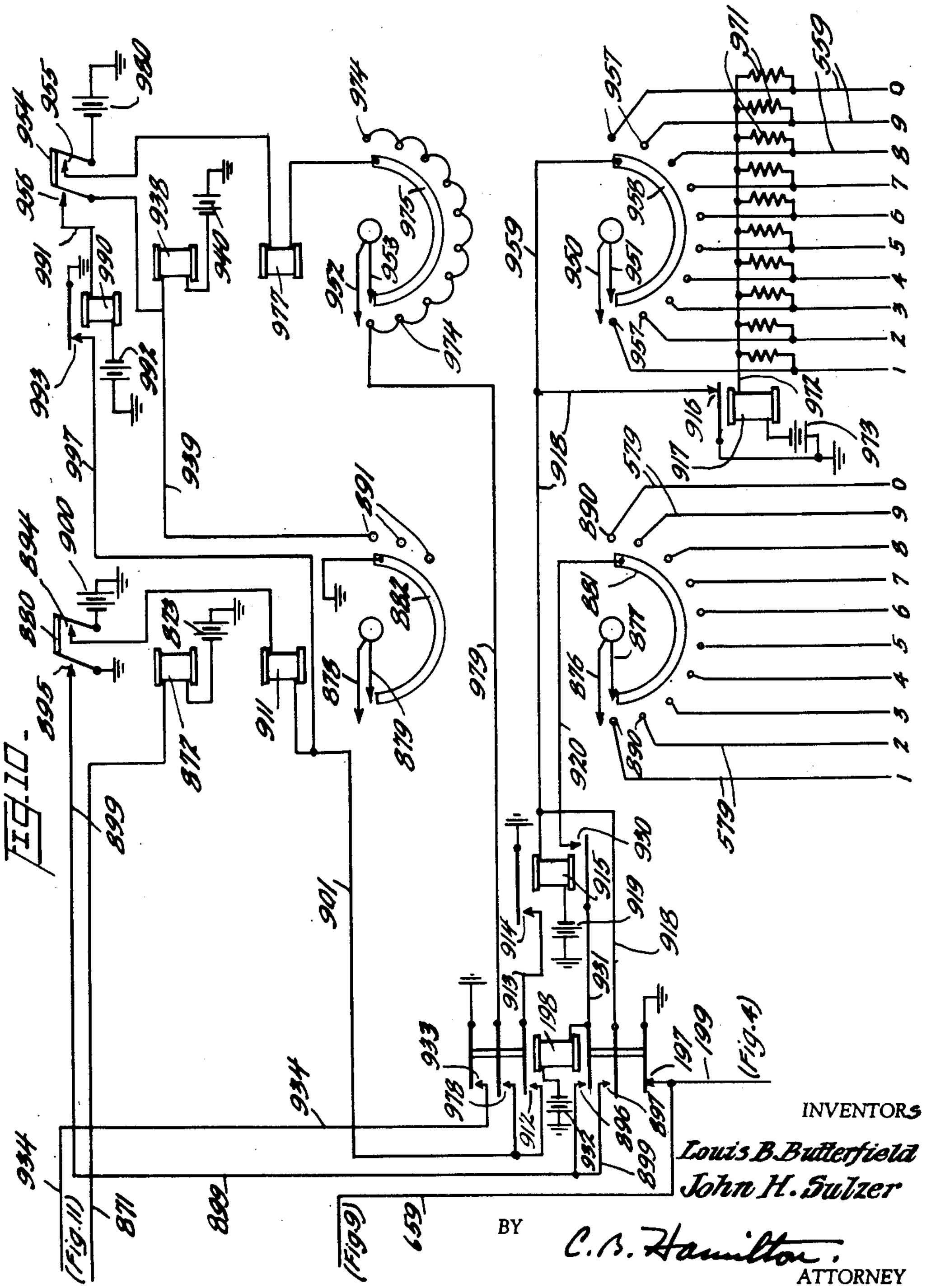

Stepping relay 419 and relays 539 and 540 (Fig. 8) associated therewith are operated in the same manner as described in conjunction with the operation of relays 416 to 418, inclusive, so that relay 419 rotates two pairs of electrically interconnected selector arms 550, 551 and 552, 553 over contacts 173 and 554, respectively, until such time as arm 550 advances into position on the contact 173 grounded by a permutation of holes 50 or 314 representing the digit in the tens denominational column of the number indicating the quantity of copies to be made by the reproducer 29. Relays 539 and 540 operate to close a contact 555 which connects a grounded switch arm 556 through a conductor 557, a conducting ring 558, arms 552, 553, to one of the contacts 554. Each of the designated contacts 554 is connected through a conductor 559 to a like designated contact on a tens denominational column relay in the counting circuit 41 (Fig. 10).

The stepping relay 420 and relays 571 and 572 associated therewith operate in the same manner as the preceding relays 419, 539 and 540 to provide ground through a contact 573, a conductor 574, a conducting ring 575, a pair of electrically interconnected selector arms 576, 577, to one of the bank of contacts 578. Each of a plurality of conductors 579 electrically interconnect like designated contacts in the bank of contacts 578 and a bank of contacts associated with the units denominational column stepping relay in the counting circuit 41 (Fig. 10).

Relay 572, in operating, closes its contact 591 to connect ground through a conductor 592 (Figs. 5 and 8) to the operating coil of relay 590 (Fig. 5) to operate said relay for recycling the indexing means for the control cards 315.

Since the relay 420 is the last of the plurality of sequentially operated stepping relays in circuit 27, the attainment of its predetermined position under control of the punched card 315 or tape 51 completes the operational cycle of the stepping relay circuit 27. All of the stepping relays and the control relays associated therewith remain in their predetermined positions until such time as the desired number of copies are made by the reproducer 29, which number is represented by the predetermined positions of the selector arms associated with the second banks of contacts 554 and 578 of the relays 419 and 420. At this time, contact 197 (Fig. 10) is opened to remove ground from the conductor 211. The removal of ground from conductor 211 releases the plurality of relays 95, 194, 216, 438, 455, 471, 496, 510, 532, 533, 539, 540, 571, 572 associated with the stepping relays 178 and 415 to 420, inclusive, so that the stepping relay circuit 27 is again in condition for a new cycle of operation for controlling the reproduction of a second material or microfilm.

*Coincidence circuit*

The coincidence circuit 28 (Fig. 1) compares a predetermined number of digits in the numerical designation of the material in printing position with the numerical designation of the conductors 492, 517 and 538 (Fig. 7) grounded by the stepping relay circuit 27 under the control of either of the decoding circuits 20 or 21. If the two designations are identical, the coincidence circuit 28 provides a closed series path from a grounded battery 720 to the relay 82 (Fig. 11) so as to reestablish the operation of the reproducer 29.

Figures 11, 12, 13:
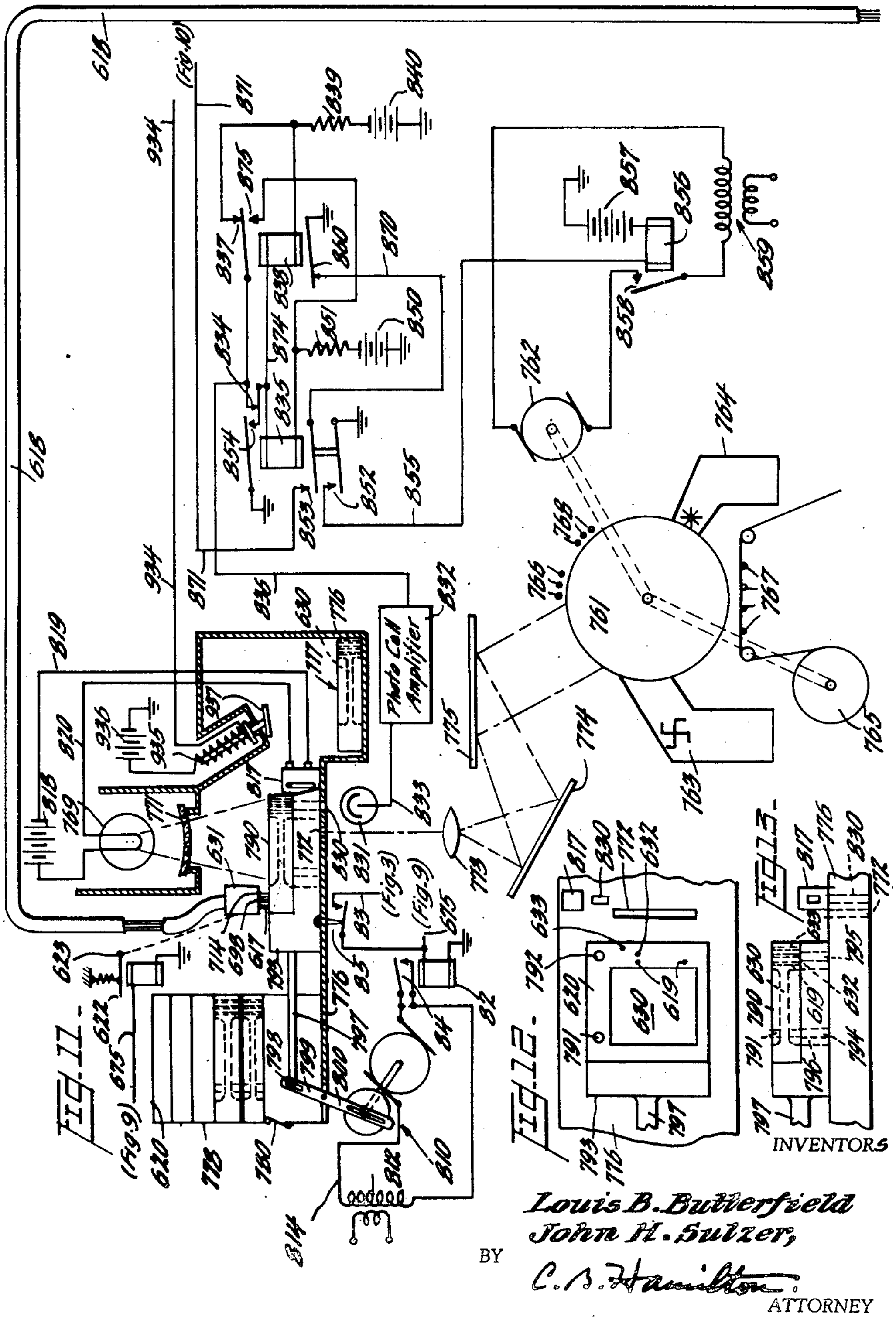
Fig. 12 is a fragmentary plan view of a holder imprinting position for holding microfilm or material to be reproduced.
Fig. 13 is a fragmentary side view of the holder with a microfilm therein in printing position.

An embodiment of the circuit 28 shown in Fig. 9 includes three identical control circuits, each of which determines the identity of designations in a different denominational column. The hundreds denominational column coincidence control comprises four relays 596*a*, 597*a*, 598*a* and 599*a*, the operating coils of which are connected to grounded batteries 600, 610, 611 and 612, respectively. A plurality of conductors 613, 614, 615 and 616 interconnect the other side of the operating coils of the relays 596*a* to 599*a*, inclusive, with a first row of sensing brushes 617 (Fig. 11) through a cable 618 (Figs. 9 and 11).

The sensing brushes 617 are selectively grounded by a permutation of holes 619 in a holder 620 (Figs. 12 and 13) carrying a material or microfilm 630 when the holder 620 is moved into sensing position beneath a sensing head 631. A grounded carrier 793 is stopped in sensing position beneath the head 631 by the opening of limit switch 85, which opening removes the energization of the relay 82 so that contact 84 opens.

The various permutations of holes 619 ground certain of the brushes 617 to operate certain of the relays 596*a* to 599*a*, inclusive, associated therewith. The row of holes 619 and two other vertical rows of holes 632, 633 in Fig. 12 represent the hundreds, tens, and units denominational columns, respectively, of the material or microfilm designation when considered from left to right in that view. The chart below shows the particular number in the denominational column which is represented by the operation of various combinations of relays in response to the grounds provided by the three rows of holes 619, 632, 633 in Fig. 12.

| Digit Number | Relays Operated | | | |
|---|---|---|---|---|
| | 596 *a, b, c* | 597 *a, b, c* | 598 *a, b, c* | 599 *a, b, c* |
| 1 | X | | | |
| 2 | | X | | |
| 3 | | | X | |
| 4 | | | | X |
| 5 | X | X | | |
| 6 | X | | X | |
| 7 | X | | | X |
| 8 | | X | X | |
| 9 | | X | | X |
| 0 | | | X | X |

The conductors 492 (Figs. 7 and 9) which are selectively grounded by the arm 475 (Fig. 7) are directly connected to a plurality of contacts 634, 635, 636, 637, 638, 639, 640, 641, 642, 643 controlled by the relay 596*a*. A series circuit is completed from one of the contacts 634 to 643, inclusive, through contacts associated with the relays 597*a*, 598*a* and 599*a*, a conductor 650, the operating coil of a hundreds denominational column check relay 651 to a grounded battery 652 in accordance with the particular operated combination of relays 596*a* to 599*a*, inclusive. If the series circuit closed by the operation of certain of the relays 596*a* to 599*a*, inclusive, representing a particular digit in the material or microfilm designation, connects a conductor 492 which is connected to the contact 474 designated by the same digit, ground is applied to the operating coil of relay 651 to operate said relay. Relay 651, in operating, closes a contact 653 and opens a contact 654.

Contact 654, in opening, breaks a circuit from grounded conductor 535 (Figs. 7 and 9) through a conductor 660, the contact 654, a conductor 670, the operating coil of an alarm 671 to grounded battery 672. The alarm 671 is provided to indicate the lack of identity between the material designation and the designation set up by the stepping relays 416 to 418, inclusive, under the control of the decoding circuits 20 or 21. If the check relay 651 operates to open the contact 654, ground is not applied through this contact to grounded battery 672 so that the alarm is not operated. However, in the event the two designations are not identical in the hundreds denominational column, check relay 651 would not be operated and thus contact 654, which remains closed, would provide ground from conductor 535 to operate the alarm 671 as an indication of a lack of identity.

Contact 653, in closing, completes a circuit between a contact 673 of the tens denominational column check relay 674 and a conductor 675 (Figs. 9 and 11) which is connected to ground through the operating coil of the reproducer start relay 82 (Fig. 11). However, if the hundreds denominational column designation represented by the hole 619 sensed by the first row of brushes 617 and the designation of the particular grounded contact 474 (Fig. 7) are not identical, check relay 651 is not operated to close contact 653 whereby start relay 82 (Fig. 11) is not operated to re-establish the operation of the reproducer 29.

Each of the relays 596*a* to 599*a*, inclusive, also has one of a plurality of normally open holding circuit contacts 655, 656, 657, 658, respectively, associated therewith. Each of the contacts 655 to 658, inclusive, is connected to ground through a conductor 659 (Figs. 9 and 10), a manual reset switch 661 and the contact 197. When one of the relays 596*a* to 599*a*, inclusive, is operated, one of the contacts 655, 656, 657, 658 associated therewith is closed to apply ground to the operating coil of the particular relay so as to hold that relay operated after ground is removed from brushes 617. The relays remain operated by virtue of this ground until such time as contact 197 (Fig. 10) is opened to indicate completion of the reproduction of the desired number of printed copies.

The tens denominational column control includes a plurality of relays 596*b*, 597*b*, 598*b*, and 599*b*, one side of each of which is connected to one of a plurality of grounded batteries 690, 691, 692 and 693, respectively.

The ground connection of the operating coils of these relays are connected through a plurality of conductors 694, 695, 696, 697 and the cable 618 to a second row of sensing brushes 698. The brushes 698 are positioned with respect to the holder 620 so that the second row of holes 632 from the left in Fig. 11 are contacted thereby so as to ground various combinations of the relays 596*b* to 599*b*, inclusive, in accordance with the permutations of holes 632 to represent particular characters in the tens denominational column as shown in the above chart. A plurality of normally open holding circuit contacts 699, 700, 701, 702, associated with the relays 596*b* to 599*b*, respectively, function as disclosed in conjunction with the operation of relays 596*a* to 599*a* so as to complete a holding circuit from conductor 659 to maintain the selected relays operated.

The plurality of conductors 517 (Figs. 7 and 9), one of which is grounded by an associated contact 501, are connected through the plurality of contacts associated with the relays 596*b* to 599*b*, inclusive, a conductor 703, the operating coil of the tens denominational column check relay 674 to a grounded battery 704. The series path closed through these contacts in response to the permutation of holes 632 sensed by the second row of brushes 698 connects a grounded contact 501 to the operating coil of the relay 674 and operates said relay to close the contact 673 and open a contact 705.

Contact 673, in closing, interconnects the contact 594 of the units denominational column check relay 595 with the contact 653 of the hundreds denominational column check relay 651 through the conductor 593. Contact 705, in opening, removes one of the parallel connections between the conductors 660 and 670 in the same manner as described in conjunction with the opening of contact 654 and serves to prevent operation of the alarm 671.

A plurality of relays 596c, 597c, 598c and 599c have one side of the operating coils thereof connected to grounded batteries 706, 707, 708 and 709, respectively. The other sides of the operating coils of the relays 596c to 599c, inclusive, are connected through conductors 710, 711, 712 and 713, respectively, and the cable 618 to a third row of sensing brushes 714. The brushes 714 selectively operate a combination of the relays 596c to 599c, inclusive, to represent a digit in the units denominational column in response to a permutation of holes 633 in the same manner as shown in the above chart. A plurality of normally open holding circuit contacts 715, 716, 717, 718, associated with the relays 596c to 599c, respectively, function as disclosed in conjunction with the operation of relays 596a to 599a to complete a holding circuit from conductor 659 for maintaining the selected relays operated.

The plurality of conductors 538 interconnect the bank of contacts 537 (Fig. 7) with a plurality of contacts associated with the relays 596c to 599c, inclusive (Fig. 9) so as to provide a series path from a particular contact 537 through the contacts associated with the relays 596c to 599c, inclusive, a conductor 719, the operating coil of the units denominational column check relay 595 to a grounded battery 720. As explained before, if the designation of the grounded contact 537 and the designation of the digit in the units denominational column on the microfilm 630 are identical, the relay 595 is operated to close the contact 594 and open a contact 730.

Contact 594, in closing, connects the grounded battery 720 through the conductor 593 to the contact 673 of the tens check relay 674. Contact 730, in opening, breaks another of the parallel connections between grounded conductors 660, 670 and the operating coil of the alarm 671.

The three rows of sensing brushes 617, 698, and 714, which are carried by the sensing head 631, contact a grounded carrier 793 through the holes 619, 632, and 633, respectively. However, the closure of the contacts 594, 653, and 673 connects battery 720 through conductor 675 (Figs. 9 and 11) to the grounded operating coil of a relay 621. Relay 621, when energized by battery 720, pivots an armature 622 about a point 623 to raise the sensing head 631 so that the brushes 617, 698, and 714 are no longer engaging the holes 619, 632 and 633. The head 631 is dropped into sensing position once again when contact 197 opens to indicate the completion of the reproduction of the desired number of copies of the film 630.

Assuming that the designation of the image bearing surface appearing on either the tape 51 or card 315 and the holder 620 are identical numbers "921," the selector arms 475, 497, 530 are indexed to ground a contact 474 designated by a "9," a contact 501 designated by a "2" and a contact 537 designated by a "1," respectively, under the control of the tape 51 or card 315.

The sensing brushes 617 operate relays 597a and 599a in response to a permutation of holes 619 representing the digit "9." Relays 597a and 599a, in closing, complete a path from grounded switch arm 479 (Fig. 7) through contact 477, conductor 490, ring 491, arms 475, 476, contact 474, conductor 492, contact 641, a contact 731 of the relay 597a, a contact 732 of the relay 598a, a contact 733 of the relay 599a, conductor 650, the operating coil of the relay 651 to grounded battery 652. Relay 651, in operating, closes contact 653 and opens contact 654.

Relays 597a and 599a, operated, also close contacts 656 and 658 to complete a holding circuit from contact 197 (Fig. 10) through conductor 659 (Figs. 9 and 10), contacts 656, 658, conductors 614, 616, operating coils of relays 597a, 599a, and therethrough to grounded batteries 610, 612, respectively. Completion of these circuits holds the relays 597a and 599a operated after the head 631 is moved out of sensing position.

Brushes 698 complete a circuit from ground through cable 618, conductor 695, the operating coil of the relay 597b to grounded battery 691 so as to operate relay 597b to close contact 700. Contact 700, in closing, completes a holding circuit for relay 597b from grounded conductor 659.

Operation of relay 597b closes a series circuit from the contact 501 designated by a "2" through conductor 517, a contact 734 of the relay 596b, a contact 735 of the relay 597b, a contact 736 of the relay 598b, a contact 737 of the relay 599b, conductor 703, the operating coil of the relay 674, to the grounded battery 704. Relay 674, in operating, closes contact 673 and opens contact 705.

The single hole 633 in the third row in Fig. 12 operates the relay 596c in the units denominational column control to close the holding contact 715, and to complete a circuit from a grounded contact 537 designated by a "1" through conductor 538, a contact 738 of the relay 596c, a contact 739 of the relay 597c, a contact 740 of the relay 598c, a contact 750 of the relay 599c, conductor 719, the operating coil of the relay 595 to grounded battery 720. Relay 595, in operating, closes contact 594 and opens contact 730.

The sequential closing of contacts 653, 673 and 594 connects grounded battery 720 through the conductors 593 and 675 (Figs. 9 and 11) to the operating coil of start relay 82 so as to operate this relay to close contact 84 for placing the reproducer 29 in operation.

The sequential opening of the contacts 654, 705, and 703 break a circuit from grounded conductor 535 through conductor 660 to parallelly connected contacts 654, 705, 730, conductor 670, the operating coil of alarm 671 to grounded battery 672 so as to prevent the operation of the alarm.

Assuming, however, that the three rows of holes 619, 632 and 633 on the holder 620 represent the number "921" and that the grounded contacts 474, 501 and 537 are designated by the numbers "9," "2," "2," respectively, the series cricuit from grounded contact 537 designated by "2" is not connected to the operating coil of the relay 595 inasmuch as the operation of relay 596c in response to the hole 633 representing the digit "1" opens a contact 751 so as to prevent the application of ground to any of the remaining contacts associated with the relays 597c to 599c, inclusive.

The failure of relay 595 to operate leaves contact 730 in a closed position and contact 594 in an open position.

Contact 594, now open, breaks the energizing circuit of the start relay 82 (Fig. 11) so that the reproducer 29 is not actuated. Contact 730, now closed, completes a circuit from grounded contact 534 (Fig. 7) through conductor 535, conductor 660, contact 730, conductor 670, the operating coil of alarm 671 to a grounded battery 672. This circuit energizes the alarm 671 to provide an audible or visual signal that the material or microfilm 630 in printing position is not the same as the image bearing surface which it is desired to print as indicated by the numerical designations of the contacts 474, 501, 537 grounded under the control of the card 315 or tape 51. In the event the two designations are not identical, ground is removed from the plurality of holding contacts by operating switch 661 so as to condition coincidence circuit 28 for the next cycle of operation.

If the two designations are identical, however, when the predetermnied number of printed copies of a single image bearing surface 630 have been produced, the contact 197 is opened to remove ground from the conductor 659. The removal of ground from conductor 659 releases all of the relays 596*a*, *b*, *c* to 599*a*, *b*, *c*, inclusive, previously operated in response to the permutations of holes 619, 632, 633 and thereby releases relay 621 to place head 631 in sensing position to condition the coincidence circuit 28 for operation during the reproduction of a second image bearing surface 630.

*Reproducer*

The reproducer 29 (Fig. 1), which in this embodiment is of the electrostatic electrophotographic type, is controlled by the tape or card decoding circuits 20 or 21 through the stepping relay circuit 27 and the coincidence circuit 28. As explained above, the reproducer 29 is conditioned for operation by the coincidence circuit 28 only when the designation of the material or microfilm 630, hereinafter referred to as microfilm 630, is identical with the designation set up by the tape 51 or card 315 to represent the material, i. e., the microfilm 630 which it is desired to reproduce. A reproducer similar to reproducer 29 is described and also claimed in a copending application of Butterfield and Sulzer, Serial No. 162,591, filed May 17, 1950.

Referring now to Fig. 11 of the drawings, a photoconductive printing roll 761 is driven by an electric motor 762. A pair of receptacles 763 and 764 are rigidly secured opposite each other and adjacent the periphery of the printing roll 761. Receptacle 763 contains a color pigment which is used to print a desired color image and receptacle 764 encloses a brush which is used to clean the surface of the printing roll 761 after each printing operation. A supply roll 765 of paper positioned adjacent a lower sector of the periphery of the printing roll 761 feeds a continuous web of paper to the roll 761 for receiving the desired color image to be printed.

Three spaced groups of electrostatic charging wires 766, 767 and 768 are positioned adjacent three separate portions of the roll 761. The wires 766 are used to place a uniform electrostatic field on the surface of the photoconductive roll 761 and the wires 767 transfer the color pigment image from the surface of the roll 761 to the surface of the paper web supplied by the roll 765. The wire group 768 applies an electrostatic field of a polarity reversed to the field produced by the wire group 766 on the photoconductive surface of roll 761 so as to reduce the fatigue thereof or to prevent breakdown of the photoconductive characteristics. The fatigue elimination effect of the wire group 768 is described more fully and also is claimed in a copending application of Butterfield and Claybourne, Serial No. 162,592, filed May 17, 1950.

An electric bulb 769 provides a source of light which is focused on the moving microfilm 630 (Figs. 12 and 13) by a lens 771. A movement of the microfilm 630 through the focused light produces variations of intensity in the light which has passed through the film 630. These variations in light intensity are then transmitted through a light restricting slit 772 (Figs. 11, 12, and 13), through an enlarging lens 773 and are finally reflected onto the photoconductive surface of the roll 761 by mirrors 774 and 775. These light variations when applied to the photoconductive surface of the moving roll 761 generate an electrostatic image which is proportional to the variations in light intensity received on the uniformly charged photoconductive surface of the roll 761.

The rotation of the roll 761 carries the progressively formed electrostatic images through the color pigment receptacle 763 wherein the electrostatic charge on the roll 761 attracts and holds the color pigments to form a color image on the surface of the roll 761, which image is subsequently transferred to the paper web by the electrostatic field of the wire group 767. Following the transfer of the color image by the electric field of the wire group 767, the surface of the roll 761 is cleaned in the receptacle 764, charged by an electric field produced by the wires 768 to reduce fatigue, and finally charged by the wires 766 to produce a uniform electrostatic field which is moved into the field of the light variations once again to produce another electrostatic image. The foregoing steps of the electrostatic printing process are carried on in an endless sequence through the continuous start-stop rotation of the printing roll 761.

A frame 776 is provided with a recess 777 at one end thereof and at the other end it supports a rack 778. The rack 778 supports a stack of the microfilm holders 620, the bottom holder being releasably held in the rack 778 by a detent member 780 pivoted to one side of the rack 778. Each of the microfilm holders 620 has a large central opening 790 extending therethrough in which a film 630 is centrally mounted. Since the film 630 is recessed from both the upper and lower surface of the film holder 620, there is no danger of damaging the surface of the film 630 by accidental abrasion or rubbing. Each of the holders 620 is also provided with two spaced vertical holes 791 and 792 (Figs. 12 and 13) which are positioned adjacent one edge of the holder 620.

An L-shaped carrier 793 having two vertical holes 794 and 795 (Fig. 13) and a vertical central opening 796 rests on the top surface of the frame 776 and is adapted to be reciprocated thereon. An arm 797 is secured to the left end of the carrier 793 and extends parallel to the upper surface of the frame 776. A pin 798 is rigidly secured to the left end of the arm 797 and projects perpendicularly therefrom to engage within the bifurcations of a forked end 799 on an upright arm 800. The arm 800 is reciprocated by a drive 810 which may be any one of the numerous well known types such as an eccentric system driven by an electric motor.

The reciprocating drive 810 is controlled by a contact 84 which connects a source of power 812 to the electric motor of the drive 810 through the conductors 813 and 814.

The initial operation of the drive 810 is accomplished by the closure of contact 80 (Fig. 3) and subsequent closure of contact 84. The films 630 to be printed and their associated holders 620 are stacked in the rack 778 with the first film 630 to be reproduced placed at the bottom of the rack 778. Operation of the drive 810 reciprocates the arm 800 thereby causing the carrier 793 to move through an oscillatory cycle between a position beneath the rack 778 and a position over an edge of the recess 777.

The operation of the drive 810 actuates the arm 800 to move the carrier 793 under the rack 778 whereby an edge of the upper surface of the carrier 793 moves the detent 780 out of its normal position to allow the first holder 620 to drop onto the carrier 793.

When the holder 620 is in place on the carrier 793, the holes 791, 792 and opening 790 are aligned with the holes 794, 795 and opening 796, respectively, in the carrier 793. The reciprocating arm 800 then moves the carrier 793 and the holder 620 with a microfilm 630 from beneath rack 778. The initial forward movement of carrier 793 opens limit switch 85 to release relay 82 which opens contact 84 preventing further forward movement of carrier 793. Also, the initial forward movement of carrier 793 from beneath rack 778 permits the brushes 617, 698, and 714 of the sensing head 631 to engage carrier 793 through the holes 619, 632 and 633 located in the leading edge of microfilm holder 620. The carrier 793 remains in position beneath the sensing head 631 until conductor 675 (Fig. 9) is connected to battery 720 by the operation of coincidence circuit 28 to indicate that the numerical designation of the microfilm 630 and the control means, either card 315 or tape 51, are identical.

When coincidence is established, battery 720 is connected to conductor 675 to operate relay 621 which pivots armature 622 at 623 to raise the sensing head 631 for disengaging sensing brushes 617, 698, 714 from holes 619, 632, and 633, respectively.

Battery 720, which was connected to conductor 675 by the coincidence circuit, operates relay 82 to close contact 84 and thus starts the forward movement of carrier 793 to move microfilm holder 620 over the light slit 772 in the frame 776 to scan the microfilm 630 and make one printed copy thereof. If only one printed copy is desired, the holder 620 and its film 630 is then ejected into the recess 777. However, where more than one printed copy is to be made, the particular holder 620 and film 630 must be reciprocated in the carrier 793 past the light slit 772 to accomplish the desired number of scanning operations. When, in the event that more than one copy is desired, the carrier 793 and holder 620 return to a position beneath the rack 778, the detent 780 is again engaged. However, the lowermost holder 620 will not drop onto the carrier 793 at this time inasmuch as the former holder 620 is still on the carrier 793. The above described cycle of operation is repeated until the holder 620 being moved by the carrier 793 is ejected therefrom. At this time, movement of the carrier 793 to engage the detent 780 releases another holder 620 which falls into the space on the carrier 793 occupied by the previous holder 620.

As the desired combinations of relays 596, 597, 598, 599 *a*, *b*, *c*, of the coincidence circuit remain locked operated for the duration of the printing cycle, battery 720 remains connected to conductor 675 to hold relays 82 and 621 operated until such time as contact 197 (Fig. 10) opens to release the plurality of relays 596, 597, 598, 599, *a*, *b*, *c* previously operated and also to indicate the completion of the reproduction of the first material or microfilm 630. The release of the operated relays in coincidence circuit 28 upon ejection of the first microfilm 630 releases relays 82 and 621 so that the sensing head 631 is moved into position to sense the holes 619, 632, 633 on the next forward movement of the carrier 793 and so that relay 82 is only energized under the control of the limit switch 85 until such time as the coincidence of the next film 630 is established.

A switch 817 (Fig. 12), positioned on the frame 776 and in the path of movement of the carrier 793, is closed by a forward movement of the carrier 793 an instant before the leading edge of the film 630 registers with the slot 772 and remains closed until it is opened when the carrier clears or passes the switch 817 and is maintained opened during the entire reverse movement of the carrier 793 toward the rack 778. The switch 817 connects the electric light bulb 769 with a battery 818 through conductors 819, 820 so that the bulb 769 will only be illuminated during the forward movement of the carrier 793 when the microfilm 630 is scanned. Therefore, the films 630 are scanned to produce light variations on the photoconductive surface of the roll 761 only during the forward movement of the holder 620 and, consequently, any scanning during the return movement of the carrier 793 toward the rack 778 is prevented.

A slit 830 in the frame 776 (Figs. 12 and 13) is so positioned below and in alignment with the path of travel of the aligned holes 791, 794, and 792, 795 that a beam of light from the bulb 769 will pass through each aligned pair of holes in sequence and through the slit 830 to impinge on a photoelectric cell 831 therebeneath. Since the bulb 769 is energized after the switch 817 is closed by the forward movement of the carrier 793, the only light incident upon the slit 830 and, consequently, upon the cell 831 is that which passes through aligned holes 792, 795 and aligned holes 791, 794 as they pass over the slit 830 on the forward stroke of the film holder 620. The distance between the slits 772 and 830 is the same as that between the leading edge of the microfilm 630 and the leading edge of the hole 792 so that the first beam of light striking the photocell 831 corresponds exactly in time with the incidence of the first beam of light which passes through the microfilm 630 to be reflected by the mirrors 774, 775 and then impinged on the printing roll 761. The distance between the trailing edge of the microfilm 630 and the leading edge of hole 791 is so positioned that the cell 831 is energized simultaneously with the completion of the scanning of the microfilm 630.

The incidence of the first beam of light on the cell 831 produces a pulse of current which is transmitted to a photocell amplifier 832 by a conductor 833. The amplifier 832, when energized by the photoelectric cell 831, produces a ground pulse which is applied by a conductor 836 to a contact 834 of a relay 835. The ground pulse transmitted from the amplifier 832 by the conductor 836 is also applied through a normally closed contact 837 of a relay 838 to and through a resistor 839 and a battery 840 to ground. The ground pulse applied to the contact 834 completes a circuit from ground through a battery 850, a resistor 851, the operating coil of the relay 835, the contact 834, and thence to ground in the amplifier 832 through the conductor 836. Completion of this circuit operates relay 835 from the battery 850 so that contacts 852, 853, and 854 close and the contact 834 opens. Relay 838 remains unoperated throughout the duration of the first ground pulse since the ground on contact 834 is shunted around the operating coil of relay 838 by the closed contact 837.

The operation of relay 835, although removing the ground by opening contact 834, closes a holding circuit comprising grounded contact 854, now closed, the operating coil of relay 835, resistor 851, and battery 850. This holding circuit maintains the relay 835 operated after ground is removed from the contact 834.

The closure of contact 852 provides ground through a conductor 855 to an operating coil of a relay 856 and thence through a battery 857 to ground so that the relay 856 is operated to close contact 858. The contact 858 is in series with an external power supply 859, shown here as a transformer, and the motor 762 for actuating the printing roll 761. The operation of relay 856 to close contact 858 energizes the motor 762 to rotate the roll 761 and since the original ground pulse operating the relay 835 and, subsequently, the relay 856, was initiated by light passing through the aligned holes 792 and 795, which holes register with slit 830 simultaneously with the leading edge of the microfilm 630 passing over the slit 772, the roll 761 begins to rotate at the exact moment that the microfilm 630 moves across the slit 772 to produce the first light variations for generating the electrostatic image on the surface of the roll 761.

The closure of contact 853 connects ground through a contact 860 of the relay 838, conductor 870, contact 853, through a conductor 871 to an operating coil of a stepping relay 872 (Fig. 10) and thence to grounded battery 873. As long as this circuit remains closed, the relay 872 will be held operated by the battery 873.

Referring again to the carrier 793, the continuing movement thereof toward the recess 777 moves the holes 792 and 795 out of alignment with the slit 830 so that the cell 831 is no longer energized by light from bulb 769 and, consequently, the ground pulse produced by the amplifier 832 is removed from the conductor 836. The removal of ground from conductor 836 removes the shunt around the operating coil of relay 838 through contact 837, and the relay 838 is then operated by a circuit extendinng through contact 854, now closed, a conductor 874, the operating coil of relay 838, resistor 839, and battery 840. Operation of relay 838 opens the contacts 837, 860 and closes a contact 875. The opening of contact 860 breaks the circuit comprising ground, contact 860, conductor 870, contact 853, conductor 871, the operating coil of a stepping relay 872 (Fig. 10), and battery 873, whereby the relay 872 is released.

Operation of the relay 838 does not affect the continued energization of the motor 762 so the roll 761 continues to rotate in synchronism with the movement of the film carrier 793 past the slit 772 so that the progressively formed light variations at the slit 772 are continually applied to a new portion of the surface of the printing roll 761. However, as the carrier 793 and microfilm 630 reach the point at which the trailing edge of the microfilm 630 passes the slit 772, the holes 791 and 794 reach alignment with the slit 830 so that once again the cell 831 is energized by light energy from the bulb 769.

As previously described, the cell 831 energizes the amplifier 832 to produce a ground pulse which is applied through conductor 836 to the contact 834. Also, the ground pulse of conductor 836 is applied through contact 875, now closed by the operation of relay 838, to the resistor 851, battery 850 and therethrough to ground to form a ground shunt around the operating coil of relay 835. Since relay 835 is thus deprived of energization from the battery 850, the relay 835 releases and, consequently, opens contacts 852, 853 and 854, while closing contact 834.

Relay 838 remains operated although ground is removed from the operating coil thereof by the opening of contact 854 because the contact 834 is now closed and the operating coil of the relay 838 is energized by the ground pulse from amplifier 832 which is transmitted through conductor 836, contact 834, the operating coil of relay 838, resistor 839 and finally through battery 840 to ground.

The opening of contact 853 opens the operating path for energizing the relay 872 (Fig. 10) to prevent said relay from operating when relay 838 releases.

The opening of contact 852 breaks the circuit energizing the relay 856 so that contact 858 opens and subsequently removes the energization from the driving motor 762 to stop rotation of the printing roll 761. Since the aligned holes 791 and 794 are placed adjacent the end of the microfilm 630, the pulse initiating the removal of the drive to the printing roll 761 occurs simultaneously with the end of the scanning process so that rotation of the roll 761 ceases as soon as the entire film 630 has been scanned.

A slight movement of the carrier 793 and the film 630 toward the recess 777 and beyond the slit 772 moves the holes 792 and 795 out of alignment with the slit 830 so that light from the bulb 769 no longer energizes the photoelectric cell 831. As described hereinbefore, removal of the energization of cell 831 renders the amplifier 832 inoperative to produce a ground pulse and the ground is subsequently removed from the conductor 836 and contact 834. This removal of ground from contact 834 breaks the circuit comprising ground, battery 840, resistor 839, and conductor 874 so that relay 838 releases and opens contact 875 while closing contacts 837 and 860. As soon as the relay 838 is released, the circuit comprising relays 835 and 838 is conditioned for another two ground pulse cycle exactly the same as that just described. Since switch 817 is open on the return stroke of the carrier 793, the light bulb 769 will not be energized and the holes 791, 792, 794 and 795 passing over the slit 830 fail, therefore, to produce any energization of the cell 831.

*Counting circuit*

The pulses applied by the relays 835 and 838 to the conductor 871 energize the stepping relay 872 (Fig. 10) to initiate the counting circuit 41 which controls the number of printed copies to be made of a particular microfilm 630. The counting circuit 41 is set up to count the predetermined number of reproductions by the stepping relays 419 and 420 under the control of either the tape decoding circuit 20 or the card decoding circuit 21 and, upon completion of the predetermined number of reproduction, ejects the microfilm 630 in printing position so as to release the relays in circuits 27 and 28 for conditioning the entire control system to print a second microfilm 630. A counting circuit similar to circuit 41 is described and also claimed in a copending application of Butterfield and Sulzer, Serial No. 162,591, filed May 17, 1950.

The stepping relay 872 (Fig. 10), which is energized by the operation of the relay 835 and released by the operation of the relay 838, advances two pairs of contact making arms 876, 877 and 878, 879 which are rigidly secured to a single shaft to move simultaneously and closes an off-normal switch 880. The switch 880 is arranged so that the initial movement of the arms 876, 877, 878, 879 closes the switch 880 and the return of the arms 876, 877, 878, 879 to a normal home position opens the switch 880. Arms 876 and 877, which are electrically interconnected, complete a circuit between a conducting ring 881 and a plurality of contacts 890 which are arranged in a semi-circle to be progressively contacted, step by step, upon each advance of the arm 876. The arms 878 and 879, which are electrically interconnected, complete a circuit between a conducting ring 882 and a plurality of contacts 891 which are arranged in a semi-circle to be progressively contacted by each advance of the arm 878.

Figure 8:
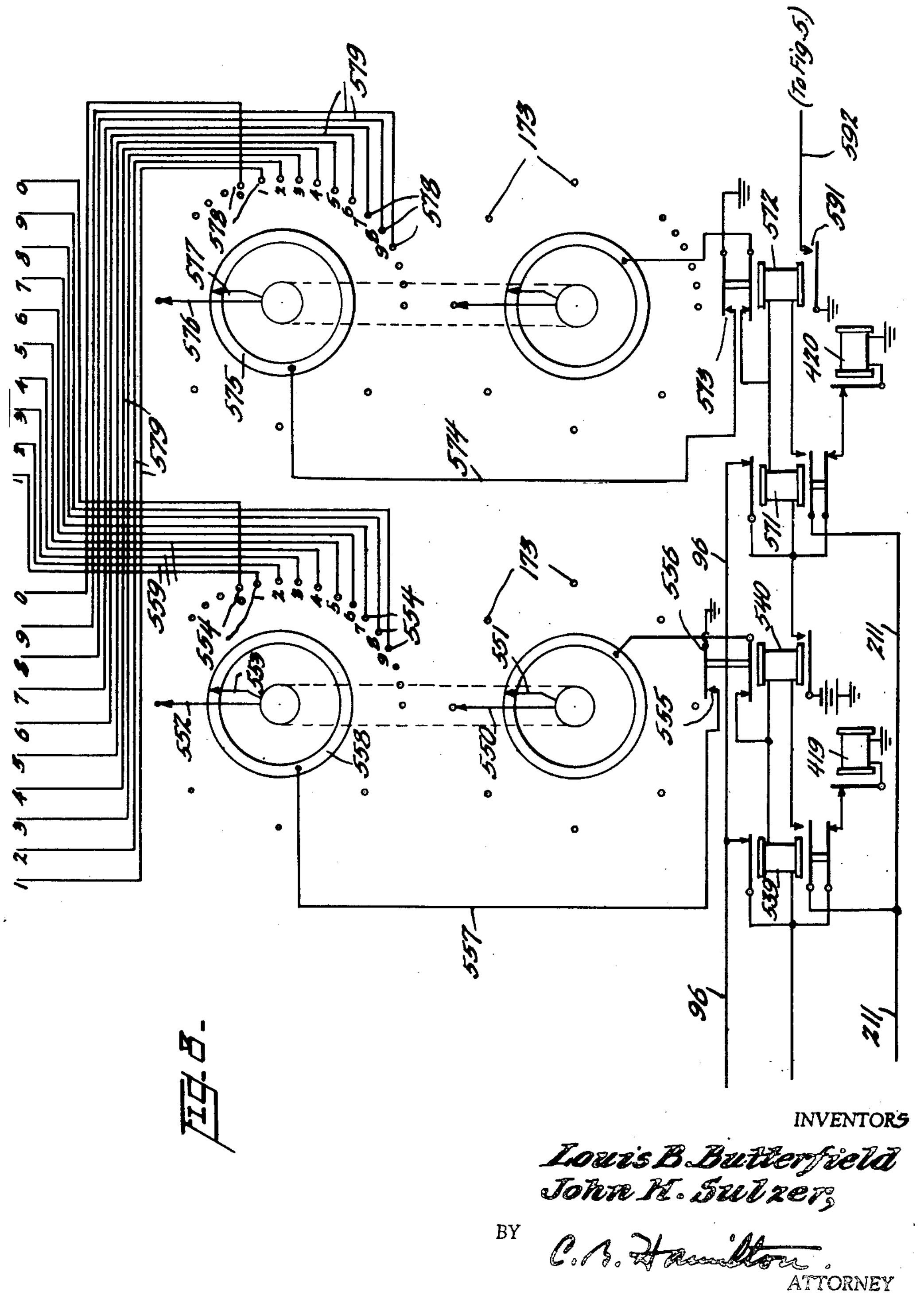

The contacts 890 are adapted to be connected to ground through the conductors 579 (Figs. 8 and 10) which are selectively grounded by the selector arms 576, 577 (Fig. 8). The contacts 890 represent the digits 1–9 and zero in the units denominational column, the contact 890 on the left in Fig. 10 representing the digit one (1) and the contact 890 on the right representing the zero or cipher, and the other intervening contacts 890 representing the digits two to nine (2–9), inclusive. Any one of the contacts 890 may be connected to ground in accordance with the particular digit desired to be registered in the units denominational column as determined by the predetermined position of the arms 576 (Fig. 8).

The operation of the off-normal switch 880 on receipt of the first pulse from the relay 872 closes contacts 894 and 895, which contacts remain closed until the relay 872 is reset to the normal home position. Contact 895, when closed, connects ground to a pair of open contacts 896 and 897 of a relay 198 through a conductor 899. Contact 894, when closed, connects grounded battery 900 to the winding of a reset relay 911. A contact 912 is adapted to be connected to ground through a conductor 913 and a normally closed contact 914 of a normally operated relay 915. The relay 915 is operated by an energizing circuit comprising ground, a normally closed contact 916 of a relay 917, a conductor 918, the operating coil of relay 915, and a grounded battery 919.

As hereinbefore explained, the pulses through the conductor 871 energize the relay 872 to progressively advance the arm 876 over the contacts 890. When the arm 876 advances to a contact 890 which is grounded through conductor 579, a circuit is completed from ground through conductor 579, arm 876, arm 877, ring 881, a conductor 920, a contact 930 of the relay 915, operated, a conductor 931, the operating coil of relay 198, and thence through grounded battery 932. This circuit energizes the relay 198 to close contacts 896, 897, 912, 978, 933 and to open contact 197.

The closing of contact 896 by the operation of relay 198 completes a holding circuit for the relay 198 through ground, switch 880, contact 895, conductor 899, contact 896, the operating coil of relay 898, and grounded battery 932. This circuit holds the relay 198 operated after the arm 876 is moved away from the grounded contact 890 and also prevents the relay 198 from opening in the event that ground is inadvertently or prematurely removed from contact 890. Contact 897, in closing, completes a holding circuit for the relay 915 through ground, switch 880, contact 895, conductor 899, contact 897, conductor 918, the operating coil of relay 915, and grounded battery 919.

Contact 197, in opening, removes ground from the plurality of relays in the coincidence circuit 28 and the stepping relay circuit 27 so that these relays release.

Contact 933, when closed, completes a circuit from ground through a conductor 934, through the operating coil of an ejector 935 (Fig. 11) for ejecting a film holder 620 off the carrier 793, and finally through a battery 936 to ground. This circuit energizes the operating coil of the ejector 935 so that an armature 937, thereof, moves downward to strike the holder 620 which is now positioned directly under the armature 937 so as to force the holder 620 out of the carrier 793 and into the recess 777. Therefore, the operation of the relay 898 by the arm 876 reaching a predetermined grounded contact 890 causes the ejection of the microfilm 630 and holder 620 in response to a predetermined number of counted movements of the film 630.

Contact 912, when closed by the relay 198, energizes the reset relay 911 through a circuit comprising ground, contact 914, conductor 913, contacts 912, a conductor 901, operating coil of relay 911, contact 894 of switch 880, and grounded battery 900. Operation of the relay 911 causes the arms 876, 877, 878, 879 to return to their normal home position, i. e., the position before receipt of any pulses, and the homing movement of the arms 876, 877, 878, 879 causes the off-normal switch 880 to return to its normal home position, thus opening the contacts 894 and 895. The opening of contact 895 breaks the holding circuit associated with relay 198 thus causing the relay 198 to open contacts 978, 896, 897, 912, 933 and to close contact 197 thus breaking the holding circuit of relay 915. However, since the contact 916 of relay 917 remains closed, the relay 915 remains operated by the ground provided through the contact 916 and the conductor 918. The opening of contact 894 breaks the energizing circuit of the reset relay 911 thereby allowing advance of the arms 876, 877, 878, 879 upon receipt of future pulses by the stepping relay 872.

The opening of the contact 933, by the release of relay 198 breaks the energizing circuit of the ejector 935 and the armature 937 thereof returns to a normal position. The opening of contacts 896, 897 and 912 conditions the relay 198 for another cycle of pulse counting. In effect, therefore, the energization of the reset relay 911, upon ejection of the microfilm 630 and holder 620, conditions the counting circuit 41 for another complete counting cycle.

In order to count more than the ten pulses made available by the ten contacts 890, a second stepping relay 938 representing the digits in the tens denomination column is connected to be energized by completion of a circuit extending from ground through conducting ring 882, arms 878 and 879, contact 891, conductor 939, the operating coil of relay 938, a battery 940, and thence to ground. Relay 938 is similar to relay 872 in having two pairs of electrically interconnected arms 950, 951 and 952, 953 which are mounted for simultaneous rotation. An off-normal switch 954 is arranged, as in relay 872, to close two contacts 955, 956 upon receipt of the first pulse to be counted and to open the contacts 955, 956 upon return of the arms 950, 951, 952, 953 to their normal home position.

The arm 950 completes a circuit from a plurality of contacts 957 through the electrically interconnected arms 950 and 951 to and through a ring 958 which is connected to the operating coil of the relay 915 by a conductor 959 and the conductor 918. The contacts 957 are arranged to be selectively grounded by a plurality of conductors 559 which are selectively connected to ground by the selector arm 552.

Each of the contacts 957 is also connected through one of a plurality of parallelly connected resistors 971, to and through a conductor 972, to the operating coil of the relay 917, and therethrough to ground through a battery 973. The value of the resistors 971 is set high enough that the marginal relay 915 cannot be operated by a current from ground passing through two resistors 971 in series and thence through the arms 950 and 951 to the operating coil of the relay 915. This selection of the value of magnitude for the resistors 971 prevents a premature operation of the relay 915 when the arm 950 advances to a contact 957 which is not directly grounded by its associated conductor 559 but which is grounded through two serially connected resistors 971 and a conductor 559 associated with a different contact 957.

The arm 952 completes a circuit from a plurality of electrically interconnected contacts 974 through the arms 952, 953 and a contact ring 975 to a reset relay 977. The electrically interconnected contacts 974 are adapted to be connected to a contact 978 of the relay 198 through a conductor 979.

The closure of contact 955 by the operation of off-normal switch 954 connects a battery 980 from ground through contact 955 to the reset relay 977. The simultaneous closing of contact 956 connects conductor 939 to an operating coil of a relay 990 through a conductor 991 and thence to ground through a battery 992. A contact 993 of the relay 990, when operated, connects ground to the operating coil of reset relay 911 through a conductor 997.

Referring now to the contacts 957, the contact 957 on the left in Fig. 10 represents the digit one (1) in the tens denominational column while the right hand contact 957 represents zero in the tens column. The intervening contacts 957 represent the digits 2 to 9, inclusive, in the tens denominational column. When any one of the conductors 559 is grounded, a circuit is completed from ground, through conductor 559, resistor 971, conductor 972, the operating coil of the relay 917, battery 973, and back to ground. This circuit energizes the operating coil of the relay 917 to open contact 916. The opening of contact 916 breaks the circuit comprising ground, contact 916, conductor 918, the operating coil of relay 915, battery 919, and ground, so that relay 915, normally operated, releases and in doing so opens contacts 914 and 930.

Therefore, even though one of the conductors 579 is grounded, the relay 198 cannot be operated from ground through the contact 930, now open, and hence the arms 876 and 878 index to the tenth contacts 890 and 891, respectively. As arm 878 advances to the tenth contact 891, a circuit is completed from ground through ring 882, arms 879 and 878, contact 891, conductor 939, the operating coil of the relay 938, battery 940, and back to ground, whereby the relay 938 is operated to advance the arms 950, 951 and 952, 953 from the normal home position to the first contacts 957 and 974, respectively.

The movement of the arms 950, 951, 952, 953 also operates the off-normal switch 954 to close contacts 955 and 956. With contact 956 closed, a circuit is established from ground through the ring 882, through arms 879 and 878, contact 891, conductor 939, contact 956, conductor 991, the operating coil of relay 990, battery 992 and back to ground, whereby the relay 990 is operated to close contact 993.

Contact 993, in closing, connects ground to the reset relay 911 through conductor 997 so that the relay 911 is energized by the battery 900 through the closed contact 894 of the off-normal switch 880. Energization of the reset relay 911 returns the arms 876, 877, 878, 879 to their normal home position and conditions the relays 872, 198, and 915 for another cycle of pulse counting as hereinbefore described. The return of the arms 878, 879 to the normal home position removes the ground from the conductor 939 so that relay 990 releases to condition the stepping relay 938 for receiving another pulse through ground from contact 891.

The process of counting ten pulses to advance the arms 950, 951, 952, 953 to another contact 957 is repeated as described above until such time as the arm 950 advances to a contact 957 which is grounded through the conductor 559. As arm 950 engages a grounded contact 957, ground is applied through conductor 559, contact 957, arms 950, 951, ring 958, conductors 959 and 918, the operating coil of relay 915, and finally through battery 919 to ground so as to operate relay 915. The operation of relay 915 to close contacts 914 and 930 conditions relay 198 for operation the next time the arm 876 advances to a grounded contact 890 and also indicates that the counting has been completed in the tens denominational column.

As described above in conjunction with the resetting of the counting relay 872 in the unit denominational column by completion of the first count in the tens denominational column the relay 990 connects ground to the reset relay 911 to return the arms 876, 877, 878, 879 to normal home position and to open the off-normal switch 880. The relay 872 then advances the arms 876, 877, 878, 879 until arm 876 touches a grounded units contact 890 so that the relay 198 is energized by a circuit comprising grounded battery 932, operating coil of relay 198, conductor 931, contact 930, conductor 920, ring 881, arms 876 and 877, contact 890, conductor 579, and back to ground. Operation of relay 198 closes the contacts 896, 897, 912, 933, 978 and opens contact 197 associated therewith.

The closing of contacts 896, 897, 912 and 933 again performs the same function as described hereinbefore in conjunction with the explanation of the operation of the relays 872, 198, 911 and 915 when only a unit denominational number of pulses are counted. The closing of contact 978 completes a circuit for energizing the reset relay 977 from ground, through contact 914, conductor 913, contacts 912 and 978, conductor 979, contact 974, arms 952 and 953, ring 975, the operating coil of relay 977, contact 955, and grounded battery 980. Operation of the reset relay 977 moves the arms 950, 951, 952, 953 to the normal home position and releases the off-normal switch 954. The opening of contacts 955 and 956 by the release of switch 954 completes the conditioning of the entire counting system for the receicpt of a new series of ground pulses on the conductor 771 from the relays 835 and 838.

In the special situation where number to be counted, as determined by the grounded conductors 559 and 579, is an evens tens digit; i. e., 20, 30, the reset relay 977 is energized through the contact 912 rather than through the contact 993 since the combined operating time of relays 898 and 915 is much less than the time of operation of the relay 990. It is apparent that the range of the counting circuit can be extended into higher denominational columns by the addition of any desired number of groups of stepping relays similar to those shown and described in this particular embodiment.

*Printing head*

The printing head 43 (Fig. 14) includes a plurality of endless stencil belts 1000 which are selectively moved by the stepping relays 178, 415 to 420, inclusive, under the control of either the tape 51 or card 315 so as to position a line of stencil characters in printing positions adjacent the web of paper 765 bearing the reproductions of the microfilm 630. The line of stencil characters in printing position represents the data coded onto the tape 51 or card 315 by the successive permutations of holes 50 or 314, respectively.

The plurality of endless belts 1000 are individually supported by a plurality of toothed idler rollers 1001 rotatably mounted on four idler shafts 1002, 1003, 1004, 1005, so as to form an open loop. Each of the belts 1000 is separately driven by a sprocket wheel 1006 which is secured to a stepping relay shaft 1007.

Each of the stencil belts 1000 comprises a series of sets of alphabetical, numerical, and punctuative stencil characters serially arranged in the same sequential order as the like characters appearing adjacent the banks of contacts 173 associated with the stepping relays 178, and 415 to 420, inclusive, in circuit 27. Each belt 1000 is also positioned with respect to its driving sprocket 1006 so that the stencil character in printing position is identical with the character designating the contact 173 which is connected to the rotating selector arm at any one particular time.

The plurality of stepping relays 178, 415 to 420, inclusive, which are positioned adjacent the loop formed by the stencil belts 1000, are arranged so as to sequentially move each of the plurality of belts 1000 into printing position in the same sequence as the permutation of holes 50 or 314 are moved into sensing position. Therefore, as the stepping relays 178, 415 to 420, inclusive, are sequentially indexed into predetermined positions under the control of the tape 51 or card 315 to represent certain characters the stencil belts 1000 are moved into printing position with the same certain characters in alignment.

Since the relays 178, 415 to 420, inclusive, do not return to a home position at the completion of the reproduction of the first microfilm 630, it is apparent that said stepping relays always advance the belts 1000 in a clockwise direction from a position corresponding to the desired data for a particular microfilm 630 to the next proceeding position corresponding to the desired data for the next microfilm 630 to be reproduced.

The characters are applied to the web 765 by an inking brush 1008 which is geared to rotate in synchronism with the movement of the web of paper 765 so as to transfer ink from an inking roll 1009 to the web 765 through the aligned stencil characters of the belts 1000 at predetermined intervals so that each copy made by the reproducer 29 is stenciled with the desired data.

It is apparent that if it is not desired to print data such as the number of copies to be reproduced, the sprocket wheels 1006 and stencil belts 1000 associated therewith may be removed from the printing head 43 without affecting the operation thereof.

For purposes of illustration, relay 416 having two banks of contacts 173, 474, and relay 178 having only one bank of contacts 173 are shown positioned adjacent the loop formed by the belts 1000.

*General operation*

Assuming that the microfilm 630 to be printed is designated as K 283 and that 14 copies are desired, the tape 51 is punched by an attendant so that holes 50 representing the following characters are sequentially positioned on the tape 51: K, "space" operational code, "figures" operational code, 2, 8, 3, 1, 4. Obviously, more information can be set up on the tape 51 to represent sheet size, order number, etc., by adding additional stepping relay stages similar to those shown in Figs. 6, 7, and 8 of the drawings. These additional stages may be added between relay 415 (Fig. 6) and relay 416 (Fig. 7), or between relay 418 (Fig. 7) and relay 419 (Fig. 8) as well as preceding the relay 178.

If it is desired to print 4 copies of a second microfilm 630 designated as S 117, the attendant punches holes 50 so as to sequentially represent the following characters: "letters" operational code, S, "space" operational code, "figures" operational code, 1, 1, 7, "space" operational code, 4. Assuming that only two microfilms 630 are to be printed at this time, the operator or attendant punches holes 50 representing the "end of cycle" operational code immediately following the holes 50 representing the digit 4. The tape 51 is then placed in indexing position on the tape transmitter drive by the attendant.

The operator or attendant places the holder 620 with the holes 619, 632, 633 representing "283" and the film 630 secured therein into the rack 778 and places the holder 620 with the film 630 represented by the designation "117" on top of the last placed film 630 and holder 620.

In order to condition the entire system for use under the control of the tape 51, the switches 53, 56 are manually actuated to close contacts 55, 58, respectively, and switch 59 is manually closed to connect battery 60 to the tape transmitter drive clutch solenoid 70.

The operator then closes the start key 71 to operate the start relay from grounded battery 73 so that contacts 74, 75, 76 and 80 are closed.

Contacts 75, in closing, completes a holding circuit for the start relay 72 by connecting ground from contact 91 (Fig. 4) through the operating coil of the relay 72 to grounded battery 73. This circuit maintains the plurality of the contacts associated with the relay 72 closed until such time as the end of the operational cycle is reached.

Contact 76, in closing, connects battery 73 to the plurality of decoding relays 113 to 120, inclusive, so as to condition these relays for operation when the first permutation of holes 50 is moved into sensing position beneath a plurality of sensing brushes 135 to 139, inclusive.

Contact 80, in closing, connects grounded battery 81 to the operating coil of the relay 82 (Fig. 11) through limit switch 85 so that relay 82 operates to close contact 84 associated therewith. The closure of contact 84 connects the transformer 812 to the electric motor of the reciprocating drive 810 so that the carrier 793 is moved toward the rack 778. As the carrier 793 moves into position beneath the rack 778, the detent 780 is moved out of position so as to release the first holder 620 which thereupon falls into printing position on the carrier 793.

Contact 74, in closing, connects ground through the clutch operating solenoid 70 of the tape transmitter 40 to grounded battery 60 so that the drive of the tape transmitter 40 is operatively connected with the indexing mechanism to advance tape 51 into a first sensing position.

The plurality of holes 50 in the first sensing position grounds brushes 136 to 139, inclusive, so that relays 116 to 120, inclusive, are operated to close a series path from grounded switch arm 156 to the particular conductor 52 in the cable 22 designated by the character *"K."* Stepping relay 178 (Fig. 6), which was energized by the operation of the start relay 72, rotates selector arm 179 until the contact 173 grounded by the "K" designated conductor 52 is reached. This closes the circuit from the ground to operate the relay 95 so that contact 196 is closed and contacts 94, 175 are opened.

Contact 175, in opening, removes the energization of the stepping relay 178 so that the selector arm 179 remains in position on the "K" designated contact and also stops the rotation of the relay shaft 1007 so that a stencil character "K" which was moved into position by the rotation of the shaft 1007 remains in printing alignment adjacent the web of paper 765.

The opening of conttct 94 disconnects battery 73 from the plurality of decoding relays so that relays 116 to 120, inclusive, release to close the energization circuit extending to the clutch solenoid 70, which solenoid, when energized, advances a second permutation of holes 50 into position beneath the plurality of sensing brushes 135 to 139, inclusive. As the tape 51 advances, ground is removed from the "K" designated contact 173 so as to operate relay 194.

Relay 194, when operated, closes a contact 212 and opens a contact 193. Contact 193, in opening, prevents a premature release of the relay 194 in the event that any of the subsequently grounded conductors in the cable 172 is also designated by "K." Contact 212, in closing, connects grounded battery 213 to the battery conductors 96 and 112 (Fig. 4) so as to operate relay 118 by virtue of a circuit extending from the brush 137 grounded by the hole 50 in the second sensing position representing the selective operational "stunt" code designation "space." The operation of relay 118 connects grounded switch arm 156 to the "space" designated contact 173 associated with the stepping relay 415 (Fig. 6).

Relay 415, which was energized by the preceding operation of relay 194, rotates the selector arm 443 until such time as the "space" designated contact 173 is reached. At this time, relay 216 is operated to remove the battery from the plurality of decoding relays and to remove the energization from the stepping relay 415 so that the selector arm 443 remains in position on the "space" designated contact 173 and the shaft 1007 remains in position with the belt 1000 at a spacing position in printing alignment. The operation of relay 216 also permits the tape transmitter 40 to advance the third permutation of holes 50 into sensing position so that relay 438 is operated to once again provide battery to the conductors 96 and 112.

The third permutation of holes 50 operates all of the relays 113 to 120, inclusive, in response to the holes 50 representing the "figures" selective operational code. Operation of these relays energizes the "figures" decoding relays 235, 236 and 237 in the same manner described in conjunction with the detailed description of the circuit 20. The energization of the "figures" decoding relays 235, 236, 237 releases the plurality of relays 113 to 120, inclusive, so that a fourth permuation of holes 50 is moved into sensing position. Since none of the contacts 173 are grounded by the "figures" operational code, the selector arms 456, 475 continue to rotate until a particular contact 173 is grounded by the fourth permutation of holes 50.

The relays 113, 114, 115, 119 and 120 are operated by the fourth permutation of holes 50 representing the numerical character "2" so that ground is applied from the ground switch arm 156 to the like designated contact 173 associated with the stepping relay 416. Relay 416 is progressively indexed until such time as selector arm 456 becomes positioned upon the grounded contacts 173 designated "2." Completion of the circuit from the grounded contact 173 operates relay 455 to remove battery from the plurality of decoding relays 113 to 120, inclusive, so that these relays release to complete the energizing circuit of the solenoid 70 whereby a fifth permutation of holes 50 is moved into sensing position beneath the plurality of brushes 135 to 139, inclusive.

The operation of relay 455 also removes the energization of the relay 416 so that the shaft 1007 associated with this relay is stopped with the numerical character "2" in printing alignment adjacent the paper web 765.

The advance of the tape 51 removes ground from the previously grounded contact "2" so that relay 471 is operated to connect ground through arm 475 to the contact 474 designated by a "2."

The original movement of the carrier 793 away from the rack 778 opens the limit switch 85 to stop drive 810 with the carrier 793 positioned below the sensing head 631 (Fig. 11) and thus permits the sensing brushes 617 to contact the permutation of holes 619 representing the digit "2" in the hundreds denominational column of the microfilm designation so that, as shown in the above chart, only relay 597*a* is operated.

The ground applied to the contact 474, designated "2," is connected through the circuit completed by the operation of relay 597*a* (Fig. 9) through the operating coil of the hundreds denominational column check relay 651 to the grounded battery 652. Operation of relay 651 closes a contact 653 and opens contact 654.

Relay 417 is progressively indexed under the control of the fifth permutation of holes 50 representing the numerical character "8" so as to connect ground from contact 511 through the contact 501 designated "8," conductor 517, to the operating coil of the tens denominational column check relay 674 by means of a circuit completed by the operation of relays 597b and 598b in response to the holes 632 sensed by brushes 698 (Fig. 11). This circuit operates relay 674 to close contacts 673 and opens contact 705.

The stepping relay 417 also moves the stencil belt 1000 associated therewith into printing alignment so that the numerical character "8" is adjacent the web of paper 765.

Relay 418 progressively advances the selector arms 518, 530 under the control of the sixth permutation of holes 50 until such time as a circuit is completed from grounded contact 534 through conductor 535, the "3" designated contact 537, conductor 538, the plurality of contacts associated with relay 598c, operated by ground sensed through hole 633 by brush 714, and normal relays 596c, 597c, 599c, the operating coil of units denominational column check relay 595 to grounded battery 720. Operation of relay 595 closes contact 594 and opens contact 730. Also, the relay 418 stops its associated belt 1000 so that the character "3" is adjacent the web of paper 765 in printing alignment.

The opening of contact 730 completes the opening of the three parallel contacts 654, 705, 730 interconnecting ground with grounded battery 672 through the operating coil of alarm 671 so that the failure of the alarm 671 to signal indicates that the numerical designation of the microfilm 630 in printing position and the designation of the desired microfilm 630 as indicated by the fourth, fifth and sixth permutations of holes 50 in the tape 51 are identical.

The closure of contact 594 connects grounded battery 720 through previously closed contacts 653, 673 to the conductor 675 and therethrough to the grounded operating coils of relays 82 and 621 (Fig. 11). Relay 621, in operating, pivots armature 622 so that sensing head 631 is raised out of sensing position. Relay 82, in operating, closes contact 84 to energize the electric motor of the reciprocating drive 810 so that the carrier 793 moves to the right in Fig. 11.

The operation of relay 533 in response to the movement of the tape 51 into the seventh sensing position connects battery to the plurality of relays 113 to 120, inclusive, in the decoding circuit 20 so that a particular contact 173 which is designated "1" and associated with the stepping relay 419 is grounded by the seventh permutation of holes 50. The relay 419 rotates the selector arms 550, 552 until such time as a selector arm 550 is positioned on the grounded contact 173 designated "1" in the manner explained in conjunction with the description of the operation of the preceding stepping relays.

Relay 539 is operated thereby to stop the rotation of the stepping relay 419 so that the character "1" on the belt 1000 associated therewith is stopped in printing position, and to advance the tape 51 into an eighth sensing position whereby the relay 540 is operated.

A particular contact 554 designated by "1" is grounded by the operation of relay 540. The ground from contact 554 is applied through conductor 559 to the like designated contact 957 associated with the tens denominational column counting relay 938 (Fig. 10). Also, the ground is applied through conductor 559, resistor 971, conductor 972, the operating coil of relay 917 to grounded battery 973 so as to operate relay 917.

The operation of relay 917 opens contact 916 to break the energizing circuit of the relay 915, thus allowing this relay to release. The operation of relay 917 and the consequent release of relay 915 indicates to the counting circuit 41 that the number of copies to be made by the reproducer 29 is in excess of ten and further prevents operation of the relay 198 until such time as the counting requirement (ten counts) in the tens denominational column is completed.

Stepping relay 420 and relays 571, 572 associated therewith operate in the same manner as described hereinabove with respect to the relays 419, 539, 540 so that ground is applied from the contact 573 through the "4" designated contact 578 to the like designated contact 890 associated with the units denominational column counting relay 872 (Fig. 10).

Relay 571, in operating, stops the rotation of the relay 420 so that the belt 1000 moved thereby is stopped with the character "4" positioned adjacent the web of paper 765 in printing alignment. The operation of relay 571 also advances the tape 51 into the next sensing position.

The carrier 793 in moving from its position beneath the sensing head 631 toward the right in Fig. 11 closes switch 817 to energize the light bulb 769 from the battery 818. When the holes 792 and 795 move into simultaneous alignment with the slit 830 and the leading edge of the microfilm 630 is in alignment with the slit 772, a beam of light passes through the microfilm 630 and the holes 792, 795 for energizing both the photoconductive surfaces of printing roll 761 and the control circuits.

The light energy from the bulb 769 which is varied in intensity in passing through the microfilm 630 is subsequently magnified by the lens 773 and reflected onto the photoconductive surface of the roll 761 by the mirrors 774 and 775. These light variations generate an electrostatic image on the surface of the roll 761. Simultaneously with the application of the light variations to the roll 761, a beam of light passing through the slit 830 energizes the photoelectric cell 831 to trigger the amplifier 832 to produce a ground pulse on the conductor 836. This ground on the conductor 836 is applied through the contact 834 to energize the relay 835, which, in operating, closes its associated contacts 852, 853 and 854. Contact 852, in closing, operates relay 856 to close contact 858, which then energizes the printing roll motor 762 from energy source 859. Therefore, the printing roll 761 is rotated by the motor 762 at the same instant with respect to time as the original instant of incidence of the light variations on the roll 761.

Contact 853, when closed, applies ground to the relay 872 through the conductor 871 so that the relay 872 is operated from battery 873 to advance the arms 876, 877, 878, 879 and to close the off-normal switch 880.

The continuing movement of the carrier 793 advances the holes 792 and 795 out of alignment with the slit 830 thereby shutting off the beam of light and the cell 831 is thus deprived of energization so that the ground is removed from the conductor 836 by the amplifier 832. The removal of ground from the conductor 836 operates relay 838 to close contact 875 and to open contacts 837 and 860. Opening contact 860 breaks the ground circuit through the conductor 871 to the relay 872 so that relay 872 returns to an unoperated state in condition for receipt of the next pulse. In addition, the continuing forward movement of the carrier 793 advances new portions of the microfilm 630 past the slit 772 so that light variations representative of the entire area of the film 630 are progressively applied to the photoconductive surface of the roll 761.

When the carrier 43 is advanced so that the trailing edge of the microfilm 630 arrives at the slit 772, the holes 791 and 794 are aligned with the slit 830 to allow a beam of light from the bulb 769 to energize the cell 831. The energization of cell 831 once again connects ground to the conductor 836 so that relay 835 is released by virtue of the ground shunt around its operating coil completed through contact 875, now closed. The release of relay 835 opens contacts 852, 853 and 854, whereby contact 852 opens the energizing circuit of the relay 856 and subsequently disconnects power from the motor 762 through the opening of the contact 858 controlled by the relay 856. In this manner, the printing roll 761 stops rotating at the same instant that the trailing edge of the microfilm 630 passes over the slit 772.

As the carrier 793 moves on toward the end of the forward cycle, the holes 791 and 794 move out of alignment with the slit 830 and the cell 831 is no longer energized so that once again the ground is removed from the conductor 836 and the relay 838 is released. In releasing, relay 838 completes the conditioning of the relays 835 and 838 for receipt of the next ground pulse on conductor 836.

Upon reaching the end of the forward cycle, the carrier 793 reverses direction to move toward the rack 778 and, in doing so, releases the switch 817 so that the light bulb 769 is extinguished. The movement of carrier 793 toward the rack 778, therefore, cannot produce either an image on the roll 761 or control impulses in the amplifier 832 since there is no source of light to energize the photoconductive surface of the roll 761 or the cell 831. The carrier 793 then moves into position beneath the rack 778 once again and moves the detent 780 to release the next holder 620. However, the original holder 620 is still in position on the carrier 793 and the holder 620 in the rack 778 remains therein. As carrier 793 reaches the end of the reverse cycle of movement, the drive 810 moves the carrier 793 in a forward direction toward the recess 777 and in doing so the detent 780 closes to secure the bottom holder 620 in position on the rack 778.

The above described cycle of operation is repeated eight more times until on the tenth forward movement of the carrier 793, the relay 872 is energized to advance the arm 878 to engage the tenth contact 891 whereby a circuit is completed from ground through ring 882, arms 879 and 878, contact 891, conductor 939, the operating coil of relay 938, and grounded battery 940. Completion of this circuit operates relay 938 to advance the arms 950, 951, 952, 953 one position from the normal home position and also to close the off-normal switch 954.

When relay 188 receives this pulse, representing the tenth forward or scanning movement of the carrier 793, the arm 950 is advanced to engage the grounded digit "1" contact 957 so as to complete a circuit from ground through conductors 557, 559 (Fig. 8), contact 957, arms 950 and 951, ring 958, conductors 959 and 918, the operating coil of relay 915, and grounded battery 919. This circuit operates relay 915 to close the contacts 930, 914 and indicates that the tens denominational column requirement (10 counts) has been fulfilled so that the next time the arm 876 engages the grounded contact 890, the ground will be applied to the operating coil of relay 198.

The reset relay 911 is energized by the relay 990 to reset the arms 876, 877, 878, 879 to the normal home position and also to open the off-normal switch 880.

As the carrier 793 completes the next four forward movements; i. e., on the fourteenth, the arm 876 is advanced by relay 872 to touch the grounded "4" contact 890 and thereby completes the energizing circuit of relay 198 comprising ground, conductors 574, 579, contact 890, arms 876 and 877, ring 881, conductor 920, contact 930, conductor 931, the operating coil of the relay 198, and grounded battery 932. The operation of relay 198, closes contacts 896, 897, 912, 933 and 978 and opens contact 197. The closing of contact 912 completes a circuit from ground to operate the elay 911, which, when operated, returns the arms 876, 877, 878, 879 to normal home position and also opens the off-normal switch 880. The closing of contact 978 completes a circuit from ground through the operating coil 976 to operate the relay 977, which, when operated, returns the arms 950, 951, 952, 953 to the normal home position and also opens the off-normal switch 954. With both relays 872 and 938 reset, the counting circuit is conditioned for another complete counting cycle in accordance with the permutation of contacts 890 and 957 that are to be grounded by the tape 51 to control the next desired number of copies to be printed.

The contact 933, when closed, completes a circuit from ground through contact 933, conductor 934, ejector 935, battery 936, and thence to ground whereby the ejector 935 is energized to move its armature 937 downward. The ejector armature 937, in moving downward, strikes the holder 620 moved by the carrier 793 and forces the holder 620 into the recess 777 to terminate the printing cycle of the first microfilm 630. Thereafter, the carrier 793 returns to the rack 778 to receive the second holder 620 with the second microfilm 630 to be printed which is designated "117."

Contact 197, in opening, releases the plurality of relays associated with the stepping relays 178, 415 to 420, inclusive, and also releases the relays 597*a*, 597*b*, 598*b*, 596*c*, 597*c*, 599*c* (Fig. 9) in the coincidence circuit 28. The release of the relays in the coincidence circuit 28 conditions that circuit for operation in response to the numerical designations sensed by the head 631 as a second holder 620 is moved into position therebeneath. Also, the release of the relays in coincidence circuit 28 disconnects battery 720 from relays 82 and 621.

Relay 621, in releasing, moves sensing head 631 into sensing position adjacent the path of movement of carrier 793. Relay 82 remains operated even though battery 720 is disconnected therefrom since limit switch 85 is closed to connect battery 81 to relay 82 when the carrier 793 is in position beneath the rack 778.

The ninth permutation of holes 50 representing the operational code "letters" operates the relays 235 to 237, inclusive, to condition the circuit for receipt of the tenth permutation of holes 50 representing the alphabetic character "S." However, this ninth permutation of holes 50 does not position the arms 179 and 190 since none of the conductors in cable 22 are grounded by the relays in circuit 20 operated in response to the "letters" operational code.

The tenth permutation of holes 50 representing the alphabetic character "S," which was moved into sensing position by the release of the relays 113, 117, 119, 120, grounds the particular contact 173 designated "S" associated with the stepping relay 178 so that arm 179 which was rotated into position upon this contact by the energization of relay 178 completes a circuit from ground to operate the relay 95. The shaft 1007 associated with the relay 178 moves the stencil character "S" into printing alignment adjacent the web of paper 765.

The subsequent relays 415 to 420, inclusive, are progressively rotated into predetermined positions under the control of the eleventh to seventeenth permutations of holes 50 so that the shafts 1007 and sprocket wheels 1006 associated therewith position the following characters in printing alignment adjacent the paper web 765: "Space," "1," "1," "7," "Space," "4."

The operation of the relays 416, 417, 418 grounds contacts 474, 501, 537 designated "1," "1," "7," respectively. Relays 596a, 596b, 596c, 598c which are operated under the control of the holes 619, 632, 633 in the holder 620 associated with the second microfilm 630 close series circuits from the grounded contacts 474, 501, 537 to operate the check relays 651, 674, 595, respectively.

The contact 578 designated by "4" is grounded by the operation of the stepping relay 420. However, none of the contacts 554 are grounded by the operation of the relay 419 inasmuch as a "space" designated contact 173 associated with the relay 419 is grounded by the tape 51. The ground on contact 578 is applied to a like designated contact 890 associated with the units denominational column counting relay 872.

The counting circuit 41 operates in the same manner as described in conjunction with the printing of the first film 630 until such time as four copies have been printed by the reproducer 29. The completion of the four printed copies by the reproducer 29 operates relay 198 to close contacts 897, 896, 912, 978, 933 and to open contact 197.

Closure of contact 933 energizes the ejector 935 so as to remove the second holder 620 and microfilm 630 carried thereby from the carrier 793. The closure of contacts 896, 897, 912 and 978 produces the same result as previously described.

Contact 197, in opening, again releases the plurality of relays associated with the stepping relays 178, 415 to 420, inclusive, and also releases the coincidence circuit relays 596a, 596b, 596c, 598c, so as to condition the coincidence circuit 28 for operation under the control of the next microfilm 630 to be printed.

The release of relay 95 connects battery to the plurality of decoding relays 113 to 120, inclusive, so that relays 116, 117 are operated under the control of the eighteenth permutation of holes 50 which, in this instance, represents an "end of cycle" selective operational code. The operation of relays 116, 117 connects grounded switch arm 156 to the operating coil of the end of cycle relay 92 through contacts 273, 274, 298, 299, 310 and a conductor 311 so as to operate relay 92. However, none of the conductors 52 in the cable 22 are grounded by the operation of relays 116, 117.

Contact 91 is opened by the operation of relay 92 to remove ground from the conductors 90 and 77 so that the holding circuit of the start relay 72 is opened thereby allowing relay 72 to release. The release of relay 72 opens contacts 74, 75, 76 and 80.

Contact 80, in opening, breaks the energizing circuit of the reciprocating microfilm drive 810 (Fig. 11). Contact 74, in opening, removes ground from the clutch solenoid 70. Contact 75, in opening, breaks the holding circuit of the relay 72 so as to condition this relay for operation the next time a system is to be used.

Contact 76, in opening, disconnects battery 73 from the plurality of decoding relays 113 to 120, inclusive, so that relays 116 and 117 are released to remove ground from the operating coil of the "end of cycle" relay 92 and in doing so releases relay 92. The release of relay 92 closes contact 91 so that the entire tape decoding circuit 20 is reconditioned for operation.

Assuming that the card decoding circuit 21 is to be utilized to control the operation of the reproducer 29 during the reproduction of the same two microfilms 630 as described in conjunction with the general operation of the tape decoding circuit 20, an attendant punches holes 314 in a first card 315 to represent the following sequence of characters: K, "space," "2," "8," "3," "1," "4." The attendant or operator then punches holes 314 in a second card 315 to represent a sequence of characters as follows: S, "space," "1," "1," "7," "space," "4."

The first card 315 is then placed on the indexing plate 391 (Fig. 5) so that the plurality of sensing brushes 350 to 361, inclusive, are positioned over the first row of holes 314 representing the character "K," and the film 630 and holder 620 designated "283" by the holes 619, 632, 633 therein is placed in the rack 778. The second film 630 and holder 620 therefore designated "117" is placed in the rack 778 on top of the first placed holder 620.

The operator then moves switches 53 and 56 so as to close contacts 54 and 57, respectively. Switch 59 is manually opened to disconnect battery 60 from the tape transmitter clutch solenoid 70. Following this conditioning of the circuits 20 and 21 for operation under the control of the cards 315, the operator closes start key 71 to initiate the operation of the entire printing system.

Key 71, when closed, operates start relay 72 so as to close contacts 74, 75, 76 and 80 associated therewith.

Contact 75, in closing, completes the holding circuit of the start relay 72. Contact 80, in closing, starts the reciprocating drive 810 (Fig. 11) for the microfilm carrier 793. Contact 76, in closing, connects battery 73 to the plurality of card decoding relays 337 to 342, inclusive, and to relays 318 and 331.

Relays 339 and 340 are operated from grounded brush 351 through conductor 344 by the application of battery to conductor 336. The brush 351 is grounded by a hole 314 in the first row of holes 314 representing the alphabetic character "K." The operation of relay 339 opens contact 333 and the operation of relay 340 closes contact 410. Contact 74, in closing, applies ground to conductors 316 and 319. However, the ground applied to conductor 319 does not operate relay 318 because of the prior opening of contact 333 by the operation of relay 339.

Contact 410, in closing, connects ground through the operating coil of the advancing relay 394 to a grounded battery 393 whereby the indexing arm 396 is advanced by the operation of relay 394 into a notch representing a second sensing position.

Brush 354 which is grounded by a second hole 314 in the first sensing position applies ground to the operating coil of relay 331 so as to operate this relay to close contact 399 and to open contact 330. However, the operation of relay 331 produces no useful function at this time.

The ground on brush 354 is also applied through conductor 371 to a closed contact 1010, designated by the alphabetic character "K." Contact 1010 is connected to a like designated contact 173 associated with the stepping relay 178 (Fig. 6).

The selector arm 179 is progressively indexed by the stepping relay 178 until such time as it becomes positioned on the "K" designated contact 173. At this time, a circuit is completed from ground through the operating coil of relay 95 so as to operate this relay to open contacts 94 and 175 and to close contact 196. Contact 175, in opening, removes the energization of the stepping relay 178 so that arm 179 remains in position on the "K" designated contact 173 and shaft 1007 remains in position with a "K" stencil character adjacent the web of paper 765 in printing position.

Contact 94, in opening, removes the energization from the relays 339 and 340 so that they release to open contact 410 and to close contact 333.

Contact 410, in opening, releases relay 394 so that indexing arm 396 is released to advance the plate 391 and card 315 positioned thereon into a second sensing position.

The stepping relays 415 to 420, inclusive, function in the same manner as described in conjunction with the description of the tape controlled decoding circuit 20 so that a "space" and the characters "2," "8," "3," "1," "4" are sequentially moved into printing alignment adjacent the web of paper 765. In addition, relay 572 is operated to close contact 591 by the completion of the positioning of relay 420. Contact 591, in closing, applied ground to relay 590 so that this relay operates to withdraw armature 580 from a notch 402 and in doing so the spring 400 returns indexing plate 391 into the first sensing position.

The coincidence circuit 28 and the counting circuit 41 are set up and function in the same manner as previouly described in conjunction with the description of the operation of the tape decoding circuit 20 so that relay 198 is operated upon the completion of the printing of the fourteenth copy of the first microfilm 630. The ejector 935 is energized to remove the first microfilm 630 and holder 620 therefor. At this time, the first card 315 is removed from the plate 391, which was previously returned to its original indexing position and the second card 315 is moved into position on the plate 391 so that the first row of holes 314 representing the alphabetic character "S" is in sensing position beneath the plurality of brushes 350 to 361, inclusive.

The card decoding circuit 21 and the remainder of the entire printing system function in the manner previously described in conjunction with the description of the operation under the control of the first card 315 and the second sequence of permutations of holes 50 in the tape 51 until such time as the fourth copy of the microfilm 630 designated "117" has been printed by the reproducer 29.

At this time, the second microfilm 630 is removed from the carrier 793 by the ejector 935 and the second card 315 is removed from the plate 391. The attendant thereupon manually actuates the release switch 79 so that contact 78 thereof is opened to remove ground from the start relay 72 to permit the release thereof.

Relay 72, in releasing, opens contacts 74, 75, 76 and 80 so as to recondition the entire printing system in the same manner as described in conjunction with the release of relay 72 under the control of the "end of cycle" relay 92 in the description of the operation of the tape decoding circuit 20.

It is to be understood that the above described arrangements are merely illustrative of the principles of the invention and that numerous other arrangements may readily be devised by those skilled in the art which fall within the spirit and scope thereof.

What is claimed is:

1. In combination with a printing machine for reproducing copies of material under the control of a record means, a sensing means responsive to indicia on the record means, a plurality of rotary stepping relays, decoding means electrically interconnecting each of the rotary stepping relays with the sensing means for sequentially rotating each of said relays to a predetermined position, a coincidence circuit under control of indicia on the material to be reproduced and the predetermined positions of a first group of said stepping relays for actuating the printing machine, and a counting circuit electrically connected to a second group of said stepping relays and under the control thereof for stopping the printing machine upon completion of a predetermined number of printed copies.

2. In combination with a printing machine for reproducing material having control indicia thereon, a printing machine actuating means, and a record controlled circuit electrically connected to the actuating means for determining the operation thereof, said control circuit comprising a sensing means responsive to indicia on the record, a plurality of stepping switches, a decoding means electrically interconnecting the sensing means with each of the stepping switches for sequentially moving each of the switches into a predetermined position, a coincidence circuit under the control of the material indicia and the position of a first group of the switches for energizing the actuating means, and a counting means electrically connected to and under the control of a second group of the switches for stopping the printing machine actuating means when a predetermined number of copies of the material are printed.

3. An automatic record control system for printers producing copies of material having control indicia thereon comprising a sensing means responsive to indicia on the record, a plurality of adjustable elements, means controlled by said sensing means for moving each of said adjustable elements into a predetermined position, means controlled conjointly by the predetermined positions of a first group of the plurality of adjustable elements and the material indicia for actuating the printer, means controlled by the predetermined position of a second group of the adjustable elements for stopping the printer after a predetermined number of copies have been made, and means controlled by the predetermined positions of the plurality of adjustable elements for printing predetermined indicia on each of the printed copies.

4. A system utilizing punched records for controlling the operation of a material reproducer comprising sensing means responsive to indicia on the records, a plurality of indexing elements electrically connected to and under the control of the sensing means for sequential movement into predetermined positions, a reproducer starting means electrically connected to and controlled by the predetermined positions of a first group of the indexing elements, a reproducer stopping means electrically connected to and controlled by a second group of the indexing elements, and an adjustable printing head directly connected to the indexing elements for movement therewith whereby the movement of the indexing means into the predetermined positions selectively moves a predetermined permutation of characters into alignment at a printing position.

5. A system utilizing punched records for controlling the operation of a reproducer for printing copies of material bearing control indicia representative of the particular material comprising a sensing means responsive to punched indicia on the records, a plurality of indexing means, means controlled by the sensing means for sequentially moving each of the indexing means into a predetermined position representative of the punched indicia, means under the control of both the predetermined position of the indexing means and the material control indicia for comparing the control indicia with the punched indicia, and selectively actuable means controlled by the predetermined position of the indexing means for printing a permutation of characters on each copy of the material produced, which characters are representative of the punched indicia.

6. An automatic control circuit for a copy reproducer wherein each copy is printed with predetermined characters under the control of record means comprising a sensing means responsive to indicia on the record means, a plurality of stepping switches, means electrically interconnecting the sensing means with each of the stepping switches for sequentially stepping each of the switches to a predetermined position, electrical means controlled by the stepping switches to start the copy reproducer when the switches are stepped to the predetermined position, and character means moved into printing position simultaneously with the stepping of the switches for printing said predetermined characters on each copy made by the reproducer.

7. A coincidence control circuit for microfilm printers wherein film order number indicia on a control record means is compared with a microfilm designation indicia on a microfilm to be printed comprising a sensing means responsive to the indicia on the record means, a plurality of stepping switches, decoding means electrically interconnecting the sensing means with each of the stepping switches for sequentially stepping each of the switches to close a predetermined switch representative of a digit in the film order number, comparing means electrically connected to each of said closed switches and responsive to said microfilm designation indicia for starting the microfilm printer when the film order number indicia is the same as the microfilm designation indicia, and character means connected to each of said stepping switches to be moved into said predetermined positions therewith for printing the film order number on each copy of the microfilm printed.

8. A coincidence control circuit for microfilm printers wherein film order number indicia on a control record means is compared with a microfilm designation indicia on a microfilm to be printed comprising a first sensing means responsive to the indicia on the record means, a plurality of stepping switches, decoding means electrically interconnecting the first sensing means with each of the stepping switches for sequentially stepping each of the switches into a predetermined position to close a predetermined switch representative of a digit in the film order number, a second sensing means responsive to the indicia on the microfilm to be printed, means electrically interconnecting said second sensing means and the predetermined closed switches for starting the microfilm printer only when the film order number indicia and the microfilm designation indicia are identical, and means controlled by the predetermined position of the stepping switches for printing the film order number on each copy of the microfilm produced by the printer.

9. A data coincidence and printing control circuit for reproducers wherein a first indicia on a control record means is compared with a second indicia on a material to be printed comprising a plurality of self-indexing relays having a plurality of switches arranged thereon, sensing means responsive to the first indicia and electrically connected to each of the relays for sequentially indexing each of said relays into a predetermined position to close a particular switch representative of the first indicia, a second sensing means responsive to the second indicia, a coincidence circuit electrically connected to the second sensing means and the closed switches for starting the reproducer only when the first and second indicia are identical, and character means controlled by the predetermined position of the relays for printing characters representative of the first indicia on the copies produced by the reproducer.

10. A data printing and coincidence control circuit for a reproducer comprising a first sensing means responsive to first indicia, a second sensing means responsive to second indicia, a source of electrical energy for said reproducer, a coincidence circuit electrically connected to and under the control of the first and second sensing means for connecting the reproducer to said source of electrical energy so that the reproducer will be actuated only when the first and second indicia are identical, and a selectively movable character printing means controlled by the second sensing means for printing a permutation of characters representative of the second indicia.

11. A data printing and coincidence control circuit for a copy printer comprising a sensing means responsive to first indicia, a plurality of selectively adjustable elements sequentially moved into predetermined position in response to second indicia, a coincidence circuit controlled by the sensing means and the predetermined positions of the adjustable elements for actuating the printer only when the first and second indicia are identical, and a selectively movable character printing means connected to the adjustable elements and controlled by the second indicia for printing a permutation of characters representative of the second indicia.

12. A control circuit for printers comprising a plurality of adjustable elements, a plurality of switches controlled by each of said adjustable elements, first sensing means responsive to first indicia for sequentially moving each of the adjustable elements into a predetermined position to close a plurality of switches representative of the first indicia, a second sensing means responsive to second indicia, a printer starting circuit electrically connected to and under the control of the second sensing means and a first group of the closed switches for actuating the printer only when the first and second indicia are identical, and a counting circuit electrically connected to and under the control of a second group of the closed switches for stopping the printer after a predetermined number of copies have been printed.

13. A control circuit for printers comprising a plurality of adjustable elements, a plurality of switches controlled by each of said adjustable elements, a first sensing means responsive to first indicia for sequentially moving each of the adjustable elements into a predetermined position to close a plurality of switches representative of the first indicia, a second sensing means responsive to second indicia, a printer starting circuit electrically connected to and under the control of the second sensing means and a first group of the closed switches for actuating the printer, a counting circuit electrically connected to and under the control of a second group of the closed switches for stopping the printer after a predetermined number of copies have been printed, and a selectively movable character printing means controlled by the predetermined positions of the adjustable elements for printing a permutation of characters representative of the first indicia on each printed copy.

14. A record controlled electrostatic electrophotographic reproducer comprising record sensing means, a plurality of rotary self-indexing relays electrically connected to and sequentially indexed into predetermined positions under the control of the sensing means, a coincidence circuit electrically interconnecting a first group of the relays with the reproducer to initiate the operation thereof when the first group of relays are indexed into their predetermined position, a counting circuit electrically connected to a second group of said relays to register a number representative of the predetermined positions of said second group of relays, and circuit means electrically connecting the counting circuit to the reproducer to render the counting circuit responsive to each printing movement of the reproducer, said counting circuit stopping the reproducer when the number of printing movements thereof is identical with the number registered by the counting circuit in response to the predetermined positions of the second group of relays whereby the counting circuit controls the number of copies printed by the reproducer in accordance with data on the sensed record.

15. A record controlled coincidence circuit and indicia printing head for a copy reproducer comprising a first sensing means responsive to first indicia, a plurality of rotary, self-indexing relays electrically connected to said first sensing means to be sequentially indexed thereby into predetermined positions representative of said first indicia, a second sensing means responsive to second indicia, a coincidence circuit electrically interconnecting said second sensing means and the relays to start the reproducer when the first and second indicia are identical, and a plurality of relatively movable character printing means controlled by the relays, each of said character printing means being moved by one of the relays to position a character in printing alignment representative of the predetermined position of the moving relay whereby the sequential indexing of the relays moves a permutation of characters into printing alignment representative of the first indicia.

16. An automatic control circuit for a copy reproducer utilizing record control means comprising a sensing means responsive to indicia on the record means, a plurality of automatic selectors, means electrically interconnecting the sensing means with each of the selectors for controlling the final selection of each selector, and electrical means responsive to the selectors for connecting an electric actuating circuit to the reproducer after a predetermined number of final selections are made.

17. An automatic control circuit for a copy reproducer wherein each copy is marked with predetermined characters under the control of record means comprising a sensing means responsive to indicia on the record means, a plurality of automatic electrical selectors, means electrically interconnecting the sensing means with each of the electrical selectors for determining the final selection of each selector, means responsive to the final selection of the automatic electrical selectors for starting the copy reproducer, and character means moved into marking position simultaneously with the completion of the final selection by the automatic selectors for marking said predetermined characters on each copy made by the reproducer.

18. An automatic reproducer control for printing copies of a plurality of objects and utilizing record control means comprising a sensing means responsive to first indicia on the record means representing a first of said objects, a plurality of automatic selectors electrically controlled by said sensing means, said selectors each making a first selection in response to said first indicia, means for starting said reproducer in response to said first selection, means electrically connected to and controlled by said selectors for stopping said reproducer after a predetermined number of copies of said first object have been printed, and recycling means electrically connected to and controlled by said stopping means for rendering the automatic selectors and the sensing means responsive to second indicia on the record means representing a second of the plurality of objects to be reproduced.

19. An automatic reproducer control for printing copies of a plurality of objects and utilizing record control means comprising a sensing head responsive to first indicia on the record means representing a first of said objects, a plurality of automatic selectors electrically connected to and controlled by the sensing means, said selectors each making a first selection in response to said first indicia, means for starting said reproducer in response to said first selection, counting means controlled by said selectors and responsive to each printing movement of the reproducer for counting the number of printing movements, means electrically connected to and controlled by said counting means for stopping said reproducer after a predetermined number of copies of the first object have been printed, and recycling means controlled by said counting means for rendering the sensing means and selectors responsive to second indicia on the record means representing a second of the objects to be printed.

LOUIS B. BUTTERFIELD.
JOHN H. SULZER.

References Cited in the file of this patent

UNITED STATES PATENTS

| Number | Name | Date |
|---|---|---|
| 2,083,061 | Gollwitzer | June 8, 1937 |
| 2,424,076 | Buhler | July 15, 1947 |